United States Patent [19]

Young

[11] Patent Number: 5,758,187

[45] Date of Patent: May 26, 1998

[54] METHOD FOR ENHANCING PERFORMANCE OF A RAID 1 READ OPERATION USING A PAIR OF I/O COMMAND BLOCKS IN A CHAIN STRUCTURE

[75] Inventor: B. Arlen Young, Palo Alto, Calif.

[73] Assignee: Adaptec, Inc., Milpitas, Calif.

[21] Appl. No.: 616,838

[22] Filed: Mar. 15, 1996

[51] Int. Cl.⁶ .................................................. G06F 13/14
[52] U.S. Cl. ..................... 395/844; 395/826; 395/827; 395/841; 395/852; 395/879; 395/441
[58] Field of Search ........................... 398/821–827, 398/839–848, 852–855, 878–881, 441

[56] References Cited

U.S. PATENT DOCUMENTS

| | | | |
|---|---|---|---|
| 4,374,415 | 2/1983 | Cormier et al. | 395/879 |
| 4,783,730 | 11/1988 | Fischer | 395/825 |
| 4,858,105 | 8/1989 | Kuriyama et al. | 364/200 |
| 4,901,232 | 2/1990 | Harrington et al. | 395/826 |
| 4,905,184 | 2/1990 | Giridhar et al. | 395/872 |
| 4,939,644 | 7/1990 | Harrington et al. | 395/825 |
| 5,131,082 | 7/1992 | Bonevento et al. | 395/275 |
| 5,170,471 | 12/1992 | Bonevento et al. | 395/837 |
| 5,251,312 | 10/1993 | Sodos | 395/425 |
| 5,261,097 | 11/1993 | Saxon | 395/650 |
| 5,287,467 | 2/1994 | Blaner et al. | 395/375 |
| 5,293,500 | 3/1994 | Ishida et al. | 395/375 |
| 5,293,624 | 3/1994 | Andrade et al. | 395/425 |
| 5,313,588 | 5/1994 | Nagashige et al. | 395/825 |
| 5,367,639 | 11/1994 | Sodos | 395/844 |
| 5,386,532 | 1/1995 | Sodos | 395/842 |
| 5,388,237 | 2/1995 | Sodos | 395/842 |
| 5,410,666 | 4/1995 | Nakano et al. | 395/425 |
| 5,428,802 | 6/1995 | Anglin et al. | 395/800 |
| 5,452,469 | 9/1995 | Sone et al. | 395/800 |
| 5,455,923 | 10/1995 | Kaplinsky | 395/481 |
| 5,459,838 | 10/1995 | Coscarella et al. | 395/827 |
| 5,504,861 | 4/1996 | Crockett et al. | 395/182.11 |
| 5,504,868 | 4/1996 | Krakirian | 395/825 |
| 5,548,795 | 8/1996 | Au | 395/872 |
| 5,584,041 | 12/1996 | Odawara et al. | 395/834 |
| 5,603,063 | 2/1997 | Au | 395/872 |
| 5,603,066 | 2/1997 | Krakirian | 395/894 |
| 5,606,684 | 2/1997 | Nakano et al. | 395/441 |
| 5,613,163 | 3/1997 | Marron et al. | 395/879 |
| 5,625,800 | 4/1997 | Brayton et al. | 395/500 |
| 5,640,596 | 6/1997 | Takamoto et al. | 395/841 |
| 5,649,225 | 7/1997 | White et al. | 395/800 |
| 5,655,147 | 8/1997 | Stuber et al. | 395/827 |
| 5,657,468 | 8/1997 | Stallmo et al. | 395/441 |
| 5,659,690 | 8/1997 | Stuber et al. | 395/309 |

Primary Examiner—Christopher B. Shin
Attorney, Agent, or Firm—Skjerven, Morrill, MacPherson, Franklin & Friel LLP; Forrest E. Gunnison

[57] ABSTRACT

An I/O command block, that is stored in a memory, includes information for connecting the I/O command block to other I/O command blocks in a chain structure. The I/O command block chain structure allows simultaneity of execution, provides a mechanism to inhibit and enable execution of an individual I/O command block, and a mechanism for establishing precedence in the sequence of execution of the I/O command blocks. This level of capability is provided by only information in the I/O command blocks within the chain. To enhance a RAID 1 read operation, a pair of killer I/O command blocks for the RAID 1 read operation are built in a chain. Each of the killer I/O command blocks includes a read command for a target device. The pair of killer I/O command blocks are enabled concurrently for execution. During execution, one of the pair of killer I/O commands marked for abortion by the other of the pair of killer I/O commands upon the other of the pair of killer I/O commands initiating data transfer.

5 Claims, 19 Drawing Sheets

METHOD FOR ENHANCING PERFORMANCE OF A RAID 1 READ OPERATION USING A PAIR OF I/O COMMAND BLOCKS IN A CHAIN STRUCTURE

RELATED APPLICATIONS

This application is related to the following copending, commonly filed, and commonly assigned U.S. Patent Applications:

1. U.S. patent application Ser. No. 08/617,990, entitled "A METHOD FOR SPECIFYING A SEQUENCE OF EXECUTION OF I/O COMMAND BLOCKS IN A CHAIN STRUCTURE," of B. Arlen Young, filed on Mar. 15, 1996 as Attorney Docket No. M-3804 US;
2. U.S. patent application Ser. No. 08/616,817, entitled "A CHAIN MANAGER FOR USE IN EXECUTING A CHAIN OF I/O COMMAND BLOCKS," of B. Arlen Young, filed on Mar. 15, 1996 as Attorney Docket No. M-3913 US;
3. U.S. patent application Ser. No. 08/616,846, entitled "AN I/O COMMAND BLOCK CHAIN STRUCTURE IN A MEMORY," of B. Arlen Young, filed on Mar. 15, 1996 as Attorney Docket No. M-3914 US;
4. U.S. patent application Ser. No. 08/615,476, entitled "A METHOD FOR SPECIFYING CONCUPRENT EXECUTION OF A STRING OF I/O COMMAND BLOCKS IN A CHAIN STRUCTURE," of B. Arlen Young, filed on Mar. 15, 1996 as Attorney Docket No. M-3915 US;
5. U.S. patent application Ser. No. 08/616,836, entitled "A METHOD FOR SPECIFYING EXECUTION OF ONLY ONE OF A PAIR OF I/O COMMAND BLOCKS IN A CHAIN STRUCTURE," of B. Arlen Young, filed on Mar. 15, 1996 as Attorney Docket No. M-3916 US;
6. U.S. patent application Ser. No. 08/615,479, entitled "A METHOD FOR ENHANCING PERFORMANCE OF A RAID 5 I/O OPERATION USING I/O COMMAND BLOCKS IN A CHAIN STRUCTURE," of B. Arlen Young, filed on Mar. 15, 1996 as Attorney Docket No. M-3918 US.

Each of the above applications is incorporated herein by reference in its entirety.

BACKGROUND OF THE INVENTION

1. Field of the Invention

The present invention is related generally to control of host adapter systems that control transfer of data between two buses, and more specifically to a method for controlling the sequence of execution of control blocks by a host adapter system.

2. Description of Related Art

The Small Computer System Interface (SCSI) standard, which is specified by the American National Standards Institute (ANSI X3.131-1986, which is incorporated herein by reference in its entirety) of 1430 Broadway, New York, N.Y. 10018, is an example of an industry-recognized standard for a relatively complex local area network. Descriptions of the SCSI bus may be found for example in U.S. Pat. No. 4,864,291 "SCSI Converter" issued Sep. 5, 1989 to J. E. Korpi and in U.S. Pat. No. 4,905,184 "Address Control System for Segmented Buffer Memory" issued Feb. 27, 1990, to R. P. Giridhar, et al., which are incorporated herein by reference in their entirety.

A typical SCSI system 100 is illustrated in FIG. 1. A plurality of intelligent devices 120, 140, 141, 142 are coupled to SCSI bus 110 so that these devices can exchange information. The intelligent devices are (i) a first host system 120, whose internal structure is shown in detail, that includes host adapter system 160 (ii) a second host system 140, whose internal structure is similar to that shown for system 120, (iii) a first SCSI disk drive unit (Target-A) 141, and (iv) a second SCSI disk drive unit (Target-B) 142. The host adapter system in a host computer can be either a single integrated circuit, or a plug-in board. In each case, the host adapter system, hereinafter host adapter, transfers data between a host computer bus, e.g., an ISA bus, an EISA bus, a VME bus, or a PCI bus, and a SCSI bus.

Typically, a software driver, executing on CPU 121 of host computer 120, builds and sends a command block to host adapter 160. Each command block specifies exactly how a SCSI command is to be executed. Host adapter 160 executes the command block, and interrupts host computer 120 to report completion of the execution. Herein, execution of a command block means performance of the SCSI command contained in the command block. Consequently, host computer 120 is interrupted at least once for every command block.

Host adapter 160 does not correlate one command block with another, and executes each command block independent of all others. Host adapter 160 may order the execution of a group of command blocks according to some criterion, such as a first-in-first-out execution order. However, typically no execution ordering information is provided by the software driver that generates and transmits the command blocks to host adapter 160.

Nevertheless, at levels higher than host adapter 160, SCSI commands are often associated in a group. For example, tagged queue commands are members of a queue group. Host adapter 160 manages tagged queue commands as a special command type, but the command blocks for such commands are still managed as independent individual command blocks.

Commands issued to a redundant array of inexpensive disks (RAID) over a SCSI bus are grouped by a RAID manager that executes on the host computer, but the commands are seen as individual, unrelated SCSI commands by the host adapter. For example, a RAID 5 write command is a group of four SCSI commands, two read commands and two write commands, that are executed in a prescribed order. The RAID manager controls the execution order by waiting for the read commands to complete before issuing the write commands. Consequently, the host adapter sees a stream of unrelated read and write commands.

The control of the execution order by the RAID manager places a burden on the computer executing the RAID manager and the performance of the RAID manager can be affected by interrupts to the host computer that are unrelated to the RAID write command. Similarly, the performance of a computer executing a SCSI host adapter driver could be enhanced if the computer was interrupted less than once per command block, and the execution time of each command block could be enhanced if it was not necessary to handle each command block independently.

U.S. Pat. No. 5,131,082, entitled "Command Delivery for a Computing System for Transfers Between a Host and Subsystem Including Providing Direct Commands or Indirect Commands Indicating the Address of The Subsystem Control Block," of Bonevento et al. shows a structure for chaining together subsystem control blocks so that the chain of subsystem control blocks is treated as one logical request. However, this structure and method requires considerable storage space. Each subsystem control block includes a chain flag, a conditional chain field, first and second chain addresses and a chain identification field.

Further, for each subsystem control block in a chain, a termination status block is defined to make it possible to handle termination at any point in the chain. Consequently, the storage required by the chain is not limited to storage required to specify the chain itself but also the storage for the termination status blocks.

The chain disclosed in this patent appears to be a variation of a linked list. Only one of the two chain addresses is used. A device task decides which chain address to select from the subsystem control block depending on the ending state of the subsystem control block. Consequently, the chain allows only branching to one of the two chain addresses and so functions as a linked list with a possible choice of paths at each item in the list.

Thus, despite the excessive storage requirements in the subsystem control block, the chain of Bonevento et al. has only limited capability. The chain structure does not support parallel simultaneous execution paths, enabling execution of multiple control blocks simultaneously, aborting a control block in the chain, or a method for determining when parallel execution paths have completed. Therefore, a more flexible chaining method and structure is needed.

SUMMARY OF THE INVENTION

According to the principles of this invention, a novel I/O command block, that is stored in a memory, includes information for connecting the I/O command block to other I/O command blocks in a chain structure. Unlike the prior art chaining structure that permitted branching to one of two chain addresses, the I/O command block chain structure of this invention allows simultaneity of execution, provides a mechanism to inhibit and enable execution of an individual I/O command block, and a mechanism for establishing precedence in the sequence of execution of the I/O command blocks.

This novel level of capability is provided by only information in the I/O command blocks within the chain, and that information requires less storage space than the prior art technique. The minimization of the storage space required to support chaining is an important aspect in making the invention available in a wide variety of situations. Also, since the chaining structure of this invention supports more complex combinations of I/O commands, the load on the host computer is diminished in comparison to the prior art methods.

In one embodiment, an I/O command block chain structure in a memory includes a plurality of I/O command block structures in the memory. Each I/O command block structure in the chain includes a chain control field and a next block pointer.

The chain control field includes a hold-off flag having first and second states. Upon the hold-off flag having the first state, execution of the I/O command block structure is inhibited. Upon the hold-off flag having the second state, execution of the I/O command block structure is enabled. Alternatively, other mechanisms can be used with the other features of this invention to enable and inhibit execution. For example, execution could be inhibited until a pointer to an I/O command block is loaded into a register or memory that in turn is used to initiate execution.

When the I/O command block structure is other than an end of chain I/O command block structure, the next block pointer is a pointer to another I/O command block structure within the I/O command block chain structure. Upon completion of execution of the I/O command in the I/O command block structure, a chain control field of the another I/O command block is analyzed by a chain manager, that is described more completely below.

At least one of the I/O command block structures in the I/O command block chain structure in the memory is a head of chain I/O command block structure. The hold-off flag in the chain control field has the second state upon loading the I/O command block chain structure in the memory so that the head of chain I/O command block structure is enabled for execution.

Another one of the I/O command block structures in the I/O command block chain structure in the memory is an end of chain I/O command block structure and the next block pointer in the end of chain I/O command block structure is a pointer to the end of chain I/O command block structure. Alternatively, the next block pointer in the end of chain I/O command block structure can be a null pointer.

The chain control field also includes a progress counter. When the progress counter has a first value, e.g., zero, the hold-flag is set to the second state to enable execution of the I/O command block structure.

The chain control field also has a concurrent flag. The concurrent flag in each I/O command block structure of a string of concurrent I/O command block structures in the I/O command block chain structure is used to indicate that the string of concurrent I/O command block structures are simultaneously enabled for execution. In one embodiment, the concurrent flag has first and second states, and concurrent flags in all I/O command block structures in the string, except a last I/O command block structure in the string, have the first state. A concurrent flag in the last I/O command block structure in the string has the second state.

In addition, the chain control field includes an abort flag. Upon the abort flag being set in a first I/O command block structure, an aborted flag in a chain control field of a second I/O command block structure in the I/O command block chain structure is set during execution of the first I/O command block structure. The first I/O command block structure in the chain has an offshoot block pointer that points to the second command block when the abort flag is set. Note, first and second, as used here, do not denote a physical location in the chain structure, but rather are used to distinguish two I/O command block structures within the chain.

Each I/O command block structure includes an offshoot block pointer. When the offshoot block pointer is not used in conjunction with the abort flag, the hold-off flag in a second I/O command block structure pointed to by the offshoot block pointer of the first I/O command block structure is unconditionally set to the second state upon completion of execution of an I/O command in the first I/O command block structure.

The chain of I/O command block structures stored in memory is a directed graph. To make a chain, the chain control field, the next block pointer, and the offshoot block pointer are configured in each I/O command block in the chain. The process of making a chain is a method for specifying a sequence of execution of a chain of I/O command blocks stored in a memory and execution of each I/O command block using only information in the chain of I/O command blocks, because as explained above the chain controls the sequence and precedence of execution of the I/O command blocks in the chain.

One operation in the method of this invention is resetting a hold-off flag in all I/O command blocks at a head of the chain, and setting a hold-off flag in all other I/O command blocks in the chain. When the hold-off flag is set, execution of the I/O command block is inhibited, and when the hold-off flag is reset, execution of the I/O command block is enabled Another operation in the method is configuring a counter in each I/O command block in the chain. The counters and the hold-off flags are used in sequencing execution of I/O command blocks in the chain.

The configuration of the counter depends on the location of the I/O command block in the chain. For a head of chain I/O command block, the counter is configured to a predefined value, e.g., one. For a non-concurrent I/O command block, that is other than a head of chain I/O command block and an end of chain I/O command block, the counter is configured to a number of I/O command blocks immediately preceding the non-concurrent I/O command block. When an immediately preceding I/O command block is a last I/O command block in a string of concurrent I/O command blocks, the number of I/O command blocks immediately preceding the non-concurrent I/O command block includes all I/O command blocks in the string. For a focal I/O command block, the counter is configured to indicate a number of execution paths that converge in the focal I/O command block when none of the execution paths are from a string of concurrent I/O command blocks.

For a concurrent I/O command block that is at the head of a string of concurrent I/O command blocks and that is other than a head of chain I/O command block, the counter is configured to a number of I/O command blocks immediately preceding the concurrent I/O command block. When an immediately preceding I/O command block is a last I/O command block in another string of concurrent I/O command blocks, the number of I/O command blocks immediately preceding the concurrent I/O command block includes all I/O command blocks in the another string.

For an I/O command block at the end of a chain, the counter is configured to the sum of:

a.) the number of non-concurrent I/O command blocks immediately preceding the I/O command block;

b.) the total number of concurrent I/O command blocks in strings immediately preceding the I/O command block; and c.) the number '1' if the I/O command block is part of a string of concurrent I/O command blocks.

In another operation of the method, a next block pointer in an I/O command block in the chain is set to point to another I/O command block in the chain. Yet another operation specifies an I/O command block that is to be simultaneously enabled for execution with at least one other I/O command block in a string of concurrent I/O command blocks by configuring a concurrent flag in the I/O command block. Still another operation configures a pair of I/O command blocks in the chain as killer I/O command blocks.

In another embodiment, the method for sequencing execution of a chain of I/O command blocks that includes a plurality of chain execution paths, and for sequencing execution of I/O command blocks within a chain execution path using only information in the I/O command blocks includes configuring a chain control block structure for each I/O command block in a first set of I/O command blocks (i) to identify a first chain execution path of the chain that includes each I/O command block in the first set of I/O commands blocks, and (ii) to specify the sequence of execution of the I/O command blocks within the first chain execution path. According to this method, a control block structure for each I/O command block in a second set of I/O command blocks is configured (i) to identify a second execution path of the chain that includes each I/O command block in the second set of I/O command blocks, and (ii) to specify the sequence of execution of the I/O command blocks within the second execution path. Finally a chain control block structure for an I/O command block is configured as a focal I/O command block for the first and second execution paths of the chain.

After the chain is configured and stored in a memory, a chain manager executing on a host adapter processor processes the chaining information in each I/O control block. In one embodiment, an I/O command in an I/O command block in the chain is executed first. The I/O command is executed in a manner that is similar to execution of a prior art unchained I/O command. However, some additional firmware may be included to allow aborting an I/O command in the chain. However, upon completion of execution of the I/O command, the chain manager is executed.

The chain manager examines the chain control field in an I/O command block pointed to by a next block pointer in the I/O command block. Upon examining the chain control field, the chain manager performs at least one operation from a plurality of operations. The at least one operation is selected based on a state of the chain control byte of the I/O command block pointed to by the next block pointer.

In one embodiment, the at least one operation includes reading a progress count, i.e., the counter described above, in the chain control byte in the next I/O command block. The chain manager checks the read progress count to determine whether the next I/O command block is a skipped I/O command block or an unskipped I/O command block.

If the next I/O command block is an unskipped I/O command block, the chain manager decrements the progress count. The chain manager then checks the progress count to determine if the next I/O command block is ready for execution. The chain manager returns the host adapter processor to an idle state upon the progress count indicating the next I/O command block is not ready for execution.

Conversely, if the next I/O command block is ready for execution, the chain manager determines whether the next I/O command block has been enabled for execution. If the next I/O command block was enabled for execution, the chain manager posts completion of execution of the chain of I/O command blocks. Alternatively, the chain manager enables execution of the next I/O command block upon determining that the next I/O command block has not been enabled for execution.

When the initial check of the progress count shows that the I/O command block is a skipped I/O command block, the chain manager skips to the first I/O command block on the chain path that is an unskipped I/O command block. The chain manager decrements a progress count in the unskipped I/O command block and then performs each of the operations described above after decrementing the progress count using the unskipped I/O command block.

While the above method of making and using the structure of this invention has great flexibility and power compared to the prior art method, individual methods within the overall method also provide a new level of capability. For example, a method for specifying concurrent execution of a string of I/O command blocks stored in a memory using only information in the string of I/O command blocks allows concurrent execution of a plurality of I/O commands.

In one embodiment, the method first configures one I/O command block in the string as a head of string concurrent I/O command block. Another I/O command block in the string is configured as an end of string concurrent I/O command block. The remaining I/O command blocks, i.e., all other I/O command blocks, in the string are configured as concurrent skipped I/O command blocks.

To configure one I/O command block in the string as a head of string concurrent I/O command block, a concurrent flag is set in the head of string concurrent I/O command block. A counter in the head of a string of concurrent I/O command block is configured to a number of I/O command blocks immediately preceding the head of string concurrent I/O command block. When an immediately preceding I/O command block is a last I/O command block in another string of concurrent I/O command blocks, the number of I/O command blocks immediately preceding the head of concurrent I/O command block includes all I/O command blocks in the another string.

The process of configuring all other I/O command blocks in the string as concurrent skipped I/O command blocks includes setting a concurrent flag in each of the all other I/O command blocks in the string. Also, a counter in the each of the all other I/O command blocks in the string is set to an illegal value, e.g., a maximum value.

The process of configuring one I/O command blocks in the string as an end of string concurrent I/O command block includes resetting a concurrent flag in the end of string concurrent I/O command block. Also, a counter in the end of string concurrent I/O command block is configured to the illegal value when the end of string concurrent I/O command block is not a focal I/O command block. When the end of string I/O block is also the end of chain I/O block, the counter is configured to the sum of:

a.) the number of non-concurrent I/O command blocks immediately preceding the end of string concurrent I/O command block;
b.) the total number of concurrent I/O command blocks in strings immediately preceding the end of string concurrent I/O command block; and
c.) the number one.

Another method of this invention, permits one I/O command block in a chain to kill another I/O command block in the chain when the execution of the one I/O command block reaches a specified point. Specifically, a method for specifying abortion of one of a pair of I/O command blocks in a chain structure configures one I/O command block in a pair to execute concurrently with another I/O command block in the pair. An offshoot block pointer in the one I/O command block is set to point to the another I/O command block. Similarly, an offshoot block pointer in the another I/O command block is configured to point to the one I/O command block.

In this method, an abort bit in each of the one and another I/O command blocks is set and an aborted bit is reset in each of the one and another I/O command blocks. Upon execution of the one and another I/O command blocks, in one embodiment, the execution of that I/O command block first initiating data transfer sets the aborted bit in the I/O command block pointed to by the offshoot block pointer in the I/O command block first initiating data transfer. After the aborted bit is set, the I/O command block is aborted at the next opportunity during execution of the I/O command block when the state of the aborted bit is checked.

The principles of this invention can be used in many RAID applications. The simplest RAID 1 read operation is performed by issuing a SCSI read command to one target. If an error is detected during the SCSI read command, a second SCSI read command is issued to the redundant target. Average disk latency time can be reduced by about 30% using the principles of this invention. SCSI commands are issued concurrently to both target drives, and the command to the target with the longer latency is aborted.

Thus, the following operations minimize total command execution time for RAID 1 operations. According to the principles of this invention, a pair of killer I/O command blocks for the RAID 1 read operation are built. Each of the killer I/O command blocks includes a read command for a target device. The pair of killer I/O command blocks are enabled concurrently for execution. During execution, one of the pair of killer I/O commands marked for abortion by the other of the pair of killer I/O commands upon the other of the pair of killer I/O commands initiating data transfer.

Similarly, the principles of this invention can be used to provide a new level of performance in RAID 5 I/O operations. In this embodiment, a plurality of I/O command blocks are configured into a chain of I/O command blocks in a memory. Each I/O command block includes one of the plurality of I/O commands necessary to perform a RAID 5 I/O operation.

Further, a set of the I/O command blocks in the chain are configured so that the set of I/O command blocks are enabled to execute concurrently, i.e., the set of I/O command blocks are a concurrent string of I/O command blocks. The chain of I/O command blocks is executed in a sequence that is specified and controlled only by information in the I/O command blocks to perform the RAID 5 operation, and executing the chain of I/O command blocks includes execution of the string of concurrent I/O command blocks concurrently.

In one embodiment, the RAID 5 I/O operation is a RAID 5 write sequence and the string of concurrent I/O command blocks includes an I/O command block for a read data disk, and an I/O command block for a read parity disk. Also, one of the I/O command blocks in the chain is configured as an offshoot command block from one of the I/O command blocks in the string of concurrent I/O command blocks.

The chaining of this invention provides a new level in sequencing execution of I/O command blocks without using the host computer after the chain is stored in a memory accessible by host adapters. In particular, one or more I/O command blocks can be at the head of a chain. One or more I/O command blocks can be enabled for execution at the completion of execution of the I/O command in each I/O command block. An additional I/O command block can be enabled to execute at the completion of execution of an I/O command block if the abort field in the completing I/O command block is not set.

Multiple chain execution paths can converge upon a single I/O command block, i.e. a focal I/O command block. Execution of the focal I/O command block is held off until certain preceding I/O command blocks have completed execution. The completion of execution of the preceding I/O command blocks can occur in any order.

Also, multiple chain execution paths can converge upon a single I/O command block, i.e. a focal I/O command block, from which multiple execution paths diverge. In this case, execution of multiple I/O command blocks are held off until certain preceding I/O command blocks have all completed execution. The completion of execution of the preceding I/O command blocks can occur in any order. When the focal I/O command block completes execution, at least one I/O command block on each of the multiple execution paths that diverge from the focal I/O command block are enabled to execute concurrently. I/O command execution is aborted cleanly in all situations.

DETAILED DESCRIPTION

Figure 1:
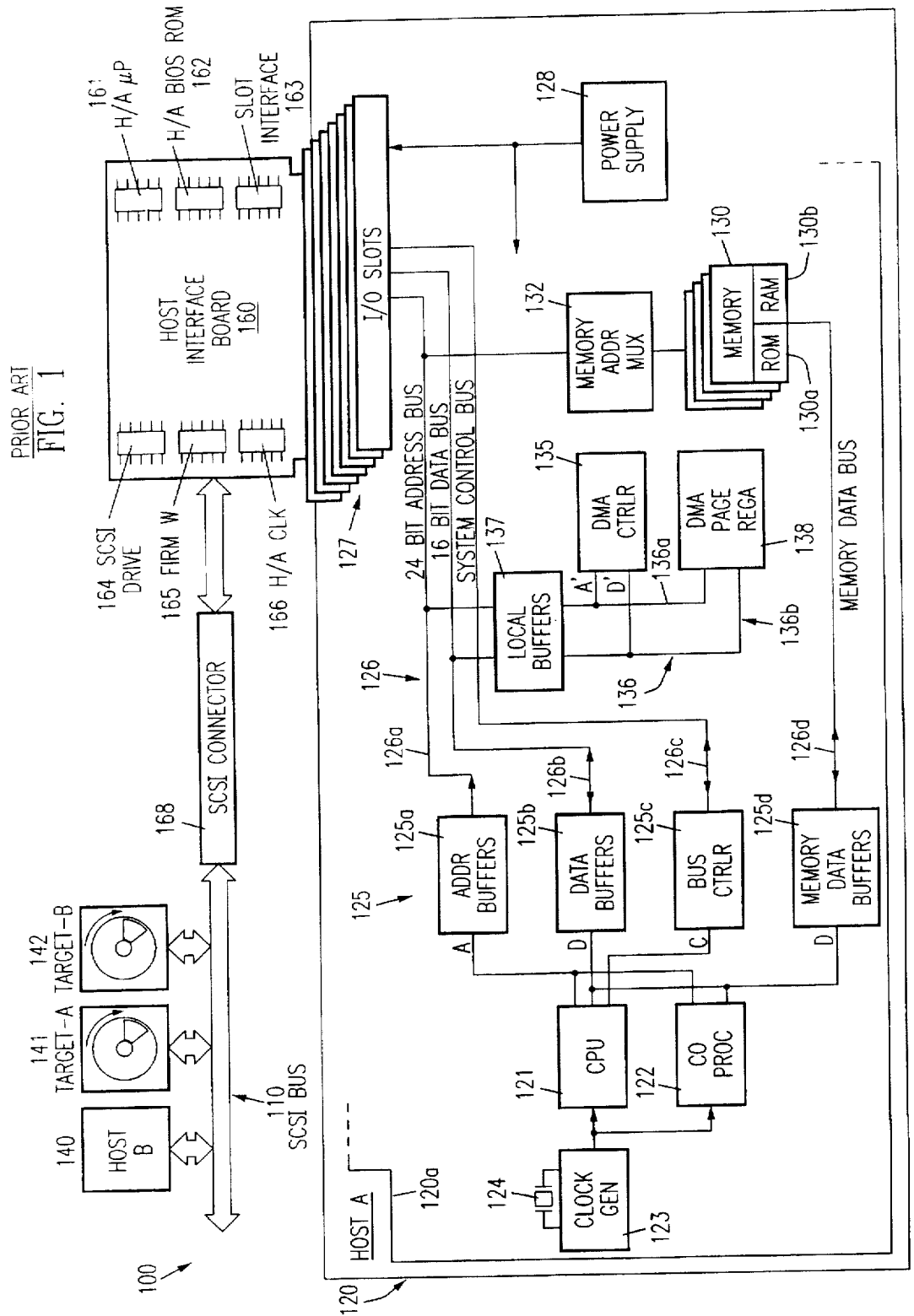
FIG. 1 is an illustration of a typical prior art SCSI system 100 that included host adapter system 160.

According to the principles of this invention, a host adapter driver 205 (FIG. 2A) executing on a host microprocessor 221 of a host computer 220 transmits a grouping of SCSI command blocks 207, called a chain of host adapter command blocks, from a host computer memory 230 to a memory 250 of SCSI host adapter 260. SCSI host adapter 260 recognizes the grouping of SCSI command blocks 207, and relieves host adapter driver 205 of some of the real-time chore of managing the sequence of execution of chain of SCSI command blocks 207.

Specifically, host adapter 260 manages the time-sequencing of the execution of the chain of commands contained in the chain of SCSI command blocks 207. This reduces the number of host interrupts generated during the execution of the chain of SCSI command blocks 207, because it is no longer necessary to interrupt host computer 220 upon completion of the execution of each SCSI command block so that host adapter driver 205 can transmit another command block to host adapter 260. Also, the load on host adapter driver 205, and consequently host computer 220 is reduced because it is unnecessary for host adapter driver 205 to control the time-sequence of the execution of chain of SCSI command blocks 207.

Figure 2A:
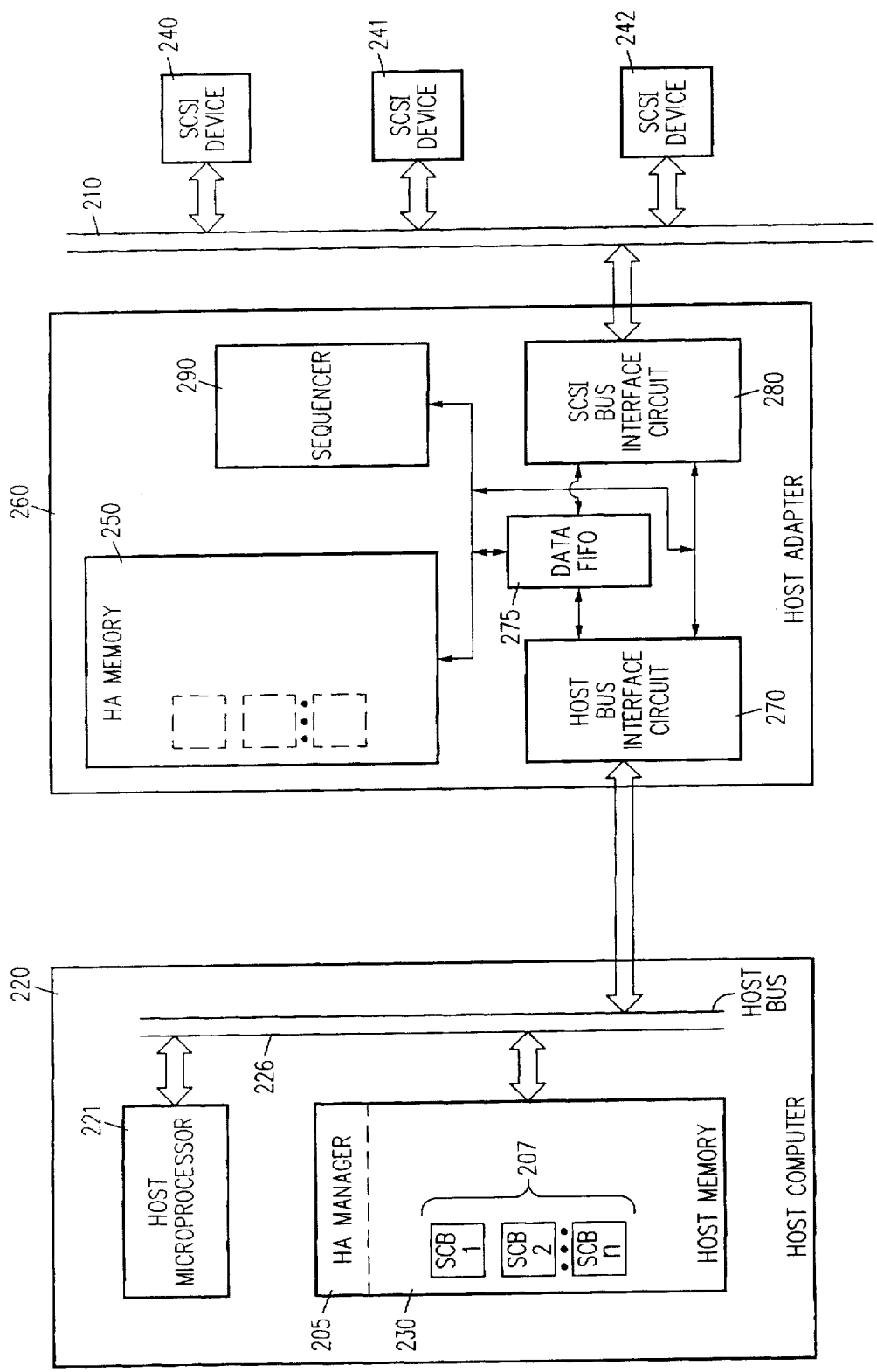
FIG. 2A is an illustration of host computer and a first host adapter system with a memory that includes the chained SCSI command blocks of this invention.

In FIG. 2A, components representative of those found in a SCSI host adapter are illustrated for completeness. The components include a host bus interface circuit 270, a SCSI bus interface circuit 280, a data first-in-first-out (FIFO) memory circuit 275 and a sequencer 290. The particular embodiment of these components is not critical to this invention. The components can be discrete components or circuits within an integrated circuit. Similarly, the particular architecture of host adapter 260 must be compatible with SCSI bus 210 and SCSI devices 240 to 242.

Figure 2B:
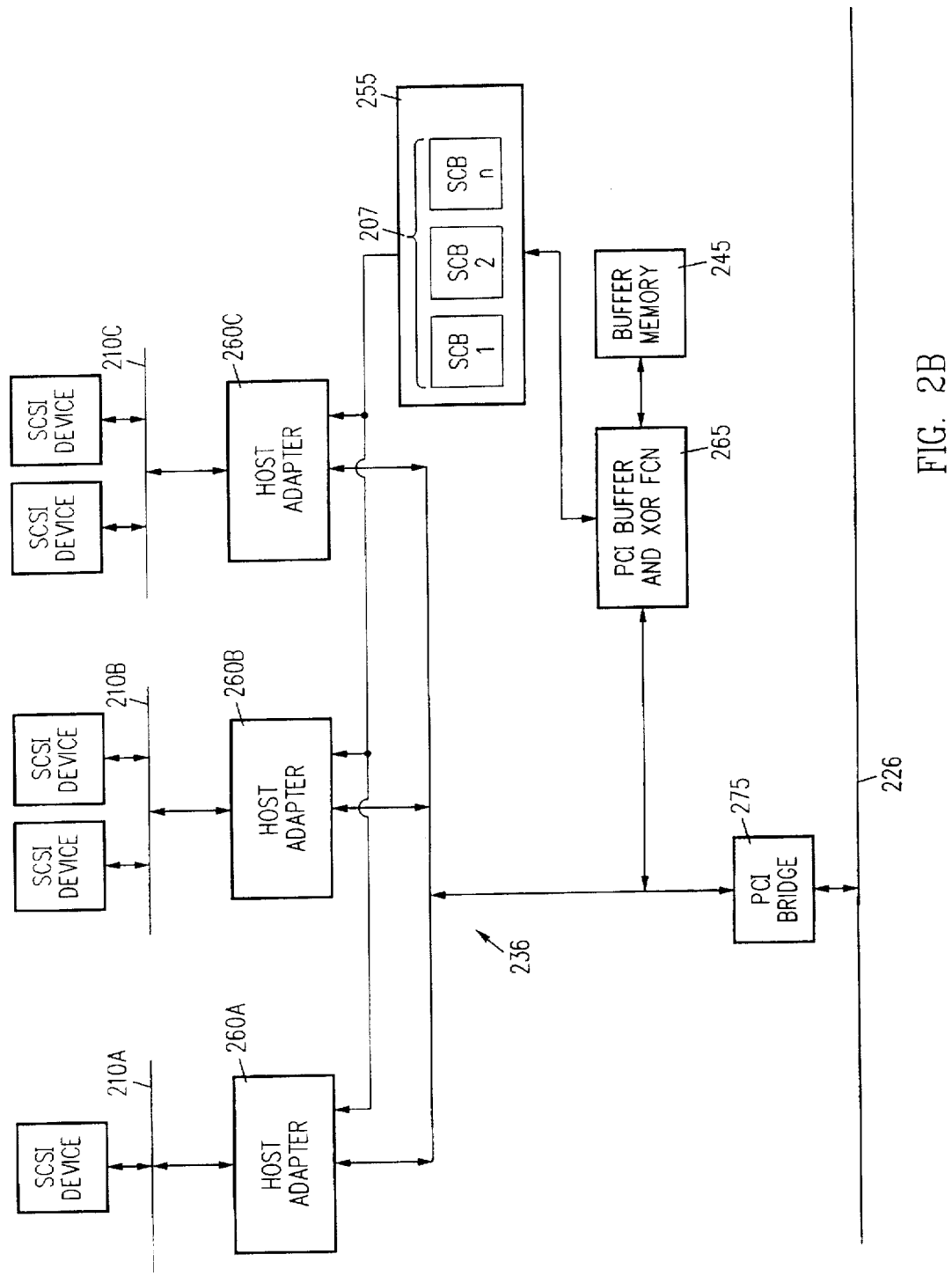
FIG. 2B is an illustration of a second host adapter system with a memory that includes the chained SCSI command blocks of this invention.

In one embodiment, a plurality of host adapters 260A, 260B, and 260C (FIG. 2B) are controlled by a single host adapter driver 205. The configuration illustrated in FIG. 2B is representative of a RAID structure in which chained SCSI command blocks 207 are particularly advantageous. As explained, more completely, chained SCSI command blocks 207 provide enhanced performance in RAID 0, RAID 1, and RAID 5 applications by reducing the work load on the host computer in comparison to the prior art method where the RAID manager and the host adapter system driver were required to control the individual transmission of a SCSI command block after the completion of execution of another SCSI command block.

In this embodiment, host adapters 260A, 260B, 260C are identical to host adapter 260 (FIG. 2A). In one embodiment, host adapters 260A to 260C are each a PCI/SCSI host adapter such as the Adaptec AIC-7870 host adapter, available from Adaptec, Inc. In this embodiment, bus interface circuits, DMA logic, and a RISC processor in integrated PCI buffer controller and XOR function integrated circuit are similar to those in the Adaptec AIC-7870 host adapter.

Although the components within in each host adapter 260A to 260C are not shown in FIG. 2B for clarity, in the subsequent description, the components are referred to by using the reference numeral of FIG. 2A and adding an A, B, or C to indicate the host adapter in FIG. 2B that includes the component. While in this embodiment, host adapters 260A to 260C are identical, this is illustrative only and is not intended to limit the invention to such a configuration. Any combination of host adapters can be used so long as the host adapters can access and execute the SCSI command blocks of this invention as described more completely below.

In the embodiment of FIG. 2B, host adapters 260A to 260C are connected to a second PCI bus 236 that in turn is connected to a PCI bus bridge 275. PCI bus bridge 275 selectively connects and disconnects second PCI bus 236 to host PCI bus 226, a first PCI bus. As is known to those of skill in the art, PCI bus bridge 275 is necessary to provide a proper load for PCI bus 226. When PCI bus bridge 275 disconnects host adapters 260A to 260C from PCI bus 226, host adapters 260A to 260C can transmit and receive data from PCI buffer controller and XOR function circuit 265 and buffer memory 245 over second PCI bus 236. A more complete description of one embodiment of circuit 265 and buffer memory 245 are given in copending, commonly filed, and commonly assigned U.S. patent application Ser. No. 08/617,993, entitled "AN INTEGRATED PCI BUFFER CONTROLLER AND XOR FUNCTION", of B. Arlen Young, which is incorporated herein by reference in its entirety.

To manage the time-sequencing of the execution of the chain of SCSI commands contained in chain of SCSI command blocks 207, host adapters 260A to 260C, (FIG. 2B) or alternatively host adapter 260 (FIG. 2A) utilize information in each of the SCSI command blocks of this invention. According to the principles of the invention, a SCSI command block includes a sequencer control block such as that described in U.S. patent application Ser. No. 08/269,491, filed on Jun. 30, 1994, entitled "A SCB ARRAY EXTERNAL TO A HOST ADAPTER INTEGRATED CIRCUIT" of Michael D. Brayton et al. and U.S. patent application Ser. No. 08/269,463, filed on Jun. 30, 1994, entitled "METHOD FOR ACCESSING A SEQUENCER CONTROL BLOCK BY A HOST ADAPTER INTEGRATED CIRCUIT" of B. Arlen Young, each of which is incorporated herein by reference in its entirety. In addition, the SCSI command blocks can be chained together by information added within the sequencer control block, or alternatively appended to the sequencer control block. Sequencer control blocks are illustrative only and are not intended to limit the invention to the particular blocks described. In view of this disclosure, the principles of this invention can by utilized with any control command block used to communicate instructions to a host adapter system, and so in general a prior art host adapter command block is modified to include the chain control information of this invention, as described more completely below.

Herein, an I/O command block used to communicate a command from a host adapter driver to a host adapter is referred to generically as a host adapter command block. A SCSI command block is an example of a host adapter command block which in turn is an example of an I/O command block. While a SCSI command block is used to illustrate the principles of this invention, this is illustrative only and is not intended to limit the invention to SCSI command blocks. In view of this disclosed, those of skill in the art can apply the principles of this invention to I/O command blocks in general.

The original fields of the sequencer control block that were utilized in the execution of the sequencer control block are unaffected by the information added to chain the sequencer control blocks together.

Figure 3:
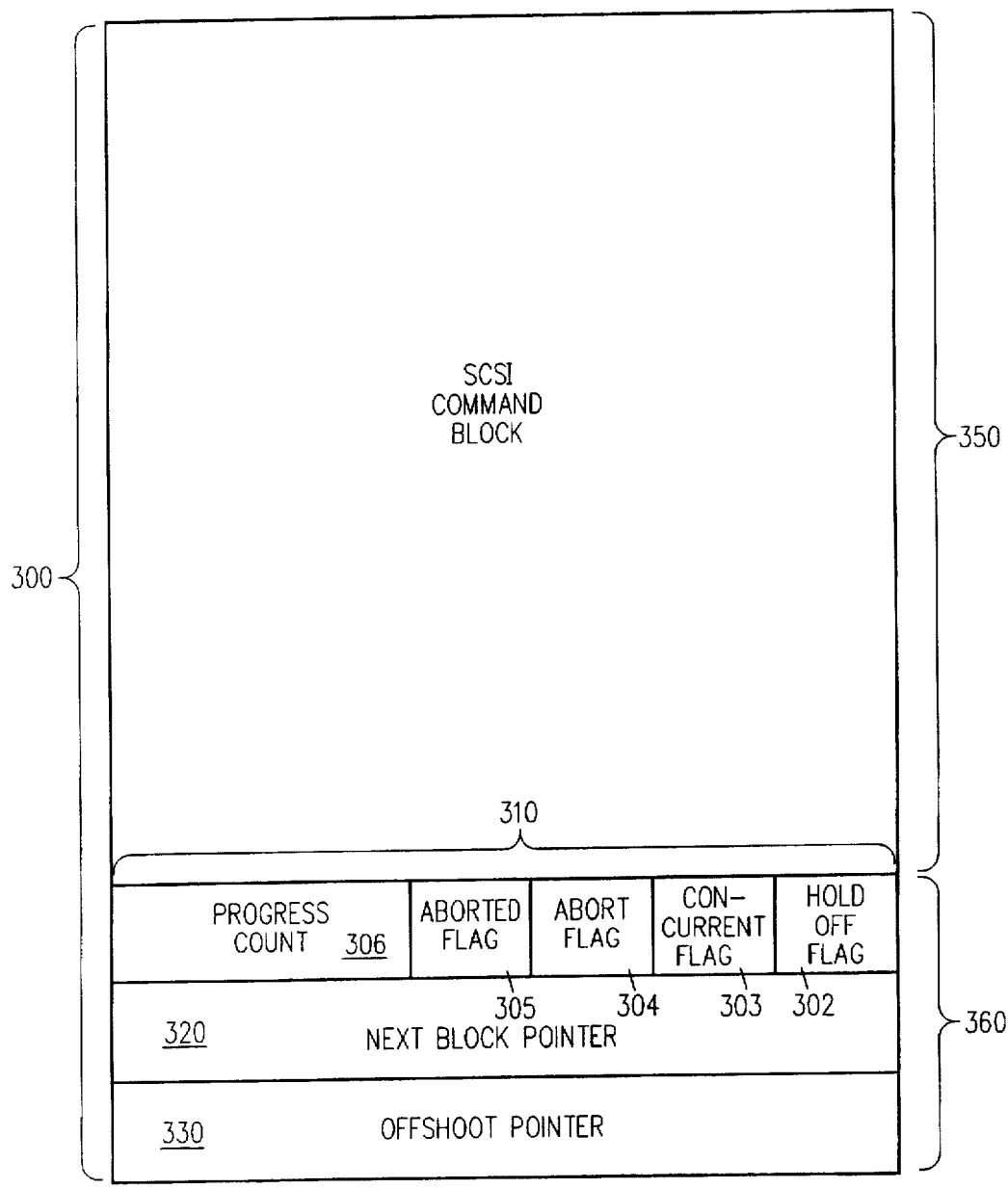
FIG. 3 is an illustration of one embodiment of the architecture of a SCSI command block 300 of this invention that is stored in a memory.

FIG. 3 is an illustration of one embodiment of the architecture of a SCSI command block 300 of this invention that is stored in a memory. SCSI command block 300 (FIG. 3) includes the prior art sequencer control block 350 and a chain control block 360 that is used to chain sequencer control block 350 to sequencer control blocks in other SCSI command blocks.

Chain control block 360 includes control bits, control counts, and pointers, and in one embodiment is contained in three bytes that are appended to sequencer control block 350. The three bytes are a chain control byte 310, a next block pointer byte 320, and an offshoot block pointer byte 330. Herein, reference numerals 310, 320 and 330 are used to indicate both the storage location and the information stored in that storage location.

Control byte 310, next block pointer byte 320 and offshoot block pointer 330 are illustrative of fields in an I/O command block that are used to specify the sequence of execution of the I/O command block in a chain. Control byte 310, as explained more completely below, also includes information that is used to inhibit execution, determine the precedence of execution, and the simultaneity of execution. In general, a chain of structures 300 is a directed graph structure. As explained more completely below, the various fields in I/O command block 300 are configured to specify a particular execution sequence and to specify the execution of I/O command blocks in the chain.

Chain control byte 310 of SCSI command block 300 includes a hold-off flag 302, a concurrent flag 303, an abort flag 304, an aborted flag 305, and a progress count 306. In this embodiment, progress count 306 is stored in bits four to seven of chain control byte 310. Progress count 306 is initialized during construction of SCSI command block 300 by host adapter driver 205. When progress count 306 is initialized to a first predefined value, e.g. a minimum value, SCSI command block 300 functions as a normal, non-chained sequencer control block, i.e. SCSI command block 300 is not a link in a chain, and the remaining fields in chain control byte 310, next block pointer byte 320, and offshoot block pointer byte 330 are not utilized during execution of SCSI command block 300.

When progress count 306 is other than the first predefined value, SCSI command block 300 is a link in a chain of SCSI command blocks. Progress count 306 is used, as described more completely below, in determining the sequence in which chained SCSI command blocks 207 are executed. Therefore, by configuring progress count 306 and the other fields in chain control block 360 according to the principles of this invention, a user can specify the sequence of execution of the SCSI command blocks in the chain.

Progress count 306 occupies the most significant bits in chain control byte 310. Further, progress count 306 is defined as the 2's complement negative of the actual progress count. For example, if the progress count is 3, progress count 306 is 1101. Progress count 306 is decremented by adding one to the stored value 306. These features allow the carry flag to be used in observing the value of progress count 306 following the decrement. The reason for using the carry flag instead of the zero flag is explained more completely below. In general, progress count 306 is an example of a counter in chain control byte 310.

Aborted flag 305, which is stored in bit 3 of chain control byte 310 in this embodiment, is reset by host adapter driver 205 when SCSI command block 300 is constructed. Aborted flag 305 can be set after SCSI command block 300 is delivered to host adapter 260 by either host adapter driver 205, or a host adapter executing a SCSI command block in chain 207.

When aborted flag 305 is set, either host adapter 260 or host adapter driver 205 is attempting to abort SCSI command block 300. Depending on when during execution aborted flag 305 is set, host adapter 260 may or may not be successful in aborting execution of SCSI command block 300. Consequently, even though aborted flag 305 is set, SCSI command block 300 may execute through to completion. In either case, SCSI command block 300 terminates in a normal manner, with execution passing to the next SCB in chain 207. The process for aborting SCSI command block 300 is described more completely below.

Abort flag 304, which is stored in bit 2 of chain control byte 310 in this embodiment, is used to abort another SCSI command block. When abort flag 304 is set in a first SCSI command block, host adapter 260 is instructed to abort a second SCSI command block in chain 207 at some point during the execution of the first SCSI command block. Offshoot block pointer 330 in the first SCSI command block identifies the second SCSI command block.

As explained more completely below, abort flag 304 facilitates an improvement in RAID 1 read performance when redundant SCSI read commands are issued concurrently to two SCSI target drives. The SCSI command block of the first SCSI target drive to start transferring data is executed through to completion. When the data transfer starts, host adapter 260 sets the aborted flag in the other SCSI command block in an attempt to abort the slower of the two SCSI target drives.

Concurrent flag 303, which is stored in bit 1 of chain control byte 310 in this embodiment, provides a mechanism for enabling more than one SCSI command block to start execution concurrently. As explained more completely below, a string of concurrent SCSI command blocks can be enabled to start execution concurrently. The first SCSI command block in the string and one or more subsequent SCSI command blocks have concurrent flag 303 set. The string is terminated by a SCSI command block having concurrent flag 303 reset.

When concurrent flag 303 is reset and the SCSI command block 300 is not the last block a string of concurrent SCSI command blocks, the SCSI command block pointed to by next block pointer 320 can be enabled to execute only after the current SCSI command block completes execution. Herein, the current SCSI command block 300 is the SCSI command block being executed by host adapter 260. Conversely, when concurrent flag 303 is set, the SCSI command block pointed to by next block pointer 320 is enabled to execute at the same time the current SCSI command block is enabled to execute. The state of concurrent flag 303 is defined by host adapter driver 205 during construction of SCSI command block 300 and is not modified during execution of the chain of SCSI command blocks 207. In one embodiment, the maximum number of SCSI command blocks in a string of SCSI command blocks enabled to run concurrently equals the maximum value of progress count 306 minus two. This assumes that first and second predefined values of progress count 306 are utilized as described herein.

Hold-off flag 302, which is stored in bit 0 of chain control byte 310 in this embodiment, must be reset to allow execution of SCSI command block 300. If hold-off flag 302 is set, SCSI command block 300 is not executed.

Typically, host adapter sequencer 290 starts execution of SCSI command block 300 by popping a pointer to SCSI command block 300 in memory 250 out of a queue-in FIFO in host adapter 260. Using the pointer to SCSI command block 300, host adapter sequencer 290 checks the state of hold-off flag 302. If hold-off flag 302 is not set, execution proceeds. If hold-off flag 302 is set, SCSI command block 300 is not enabled to execute, and sequencer 290 returns the pointer to the queue-in FIFO.

Host adapter driver 205 resets the hold-off flag in each SCSI command block in chained SCSI command blocks 207 that is at the start of the chain, i.e. at the head of chain 207. Thus, one or more SCSI command blocks can be at the head of chain of SCSI command blocks 207, and each is enabled to execute by host adapter driver 205.

Next block pointer 320, which in this embodiment is stored in the second byte of chain control block 360, points to another SCSI command block in chained SCSI command blocks 207. Typically, a driver loads the next block pointer 320 in chain control block 360. The particular way that next block pointer is obtained depends on the configuration of the system using the SCSI command blocks of this invention.

In one embodiment, a high level manager supplies a chain of SCSI command blocks 207 to a host adapter driver that communicates with host adapters 260A to 260C and integrated circuit 265, for example. The high level manager, e.g., a RAID manager, specifies in relative terms the execution sequence for SCSI commands in the chain. The host adapter driver converts the relative relationship between the SCSI commands into SCSI command blocks in the chain where each SCSI command block includes the appropriate next block pointer 320 and offshoot block pointer 330, as described more completely below.

Herein, host adapter driver 205 should be understood to mean the appropriate combination of application, manager, and hardware driver for a particular system. In view of this disclosure, those of skill in the art can implement the principles of this invention in a wide variety of applications where controlling the simultaneity, precedence, and inhibition of execution of I/O commands by the I/O commands themselves is of importance.

For SCSI command blocks at the head of a chain, next block pointer 320 points to the next SCSI command block in the chain that is enabled for execution upon completion of execution of all the SCSI command blocks that precede that SCSI command block in the chain.

If all SCSI command blocks in the chain are executing concurrently at the head of the chain, all next block pointers point to the last SCSI command block in the chain, i.e., to the end of the chain. In general, for SCSI command blocks that execute concurrently at the head of a chain, the driver enables execution of each of the SCSI command blocks. Therefore, for SCSI command blocks that execute concurrently at the head of a chain, concurrent flag 303 is not used and next block pointer 320 generally never points to another SCSI command block that is at the head of the chain. However, if one of the head of chain SCSI command blocks is also the last SCSI command block in the chain, next block pointer 320 in each of the SCSI command blocks at the head of the chain point to the SCSI command block that is also a head of chain block and simultaneously, the last block in the chain.

For the last SCSI command block in a chain, next block pointer 320 points back to that SCSI command block. For a SCSI command block between the first and last SCSI command blocks in the chain, that is a SCSI command block which is not at the head or at the end of a chain, next block pointer 320 always points to the next SCSI command block on the same chain path. Herein, a reference to a SCSI command block that is in the middle of the chain means that the SCSI command block is located in the chain between the head of the chain and the end of the chain. Thus, when middle is used herein, middle does not mean a location about a physical center of the chain. The chain of this invention is a structure in a memory and so the concept of a physical center has no meaning.

Upon completion of execution of sequencer control block 350 in current SCSI command block 300, sequencer 290 looks at the chain control byte in the next SCSI command block. As explained more completely below, sequencer 290 decides what to do with the next SCSI command block based on the state of its chain control byte. Sequencer 290 may post completion of the chain, or sequencer 290 may simply decrement the progress count in a following SCSI command block on the chain path, and return to an idle loop. Alternatively, sequencer 290 may decrement the progress count in a following SCSI command block on the chain path, enable the following SCSI command block for execution, and return to an idle loop.

Upon completion of execution of sequencer control block 350 in SCSI command block 300, execution of chained SCSI command blocks 207 can continue along two different paths. Next block pointer 320 points to the next chained SCSI command block along the normal path. Offshoot block pointer 330, which is stored in the third byte of chain control block 360 in this embodiment, points to a SCSI command block to be executed on an ancillary path.

At the completion of every SCSI command block in chain 207, an offshoot SCSI command block is enabled to begin execution if that offshoot SCSI command block has not already been enabled. The enablement of the SCSI command block identified by offshoot block pointer 330 is unconditional, i.e., it is not dependent on progress count 306.

Therefore, every SCSI command 300 block provides an opportunity to split a single chain execution path into two paths. If a split is not desired, offshoot block pointer 330 points to a chained SCSI command block which has already been enabled, such as chained SCSI command block 300, or is set to a null value. Both next block pointer 320 and offshoot block pointer 330 are set to a null value, or to point to block 300 to identify SCSI command block 300 as the block at the end of chain 207 of SCSI command blocks.

With the above definitions of chain control block 360, the function and interaction of the information in the various fields is considered further, and then a plurality of examples that illustrate the versatility of this invention are considered. Progress count 306 perform two functions. First, progress count 306 indicates whether a SCSI command block is part of a chain of SCSI command blocks, as explained above. Second, progress count 306 is used to delay starting SCSI command block 300 execution until one or more previous SCSI command blocks in chained SCSI command blocks 207 have completed execution.

For a non-concurrent SCSI command block 300 that is not at the head or the end, sometimes called tail, of chain 207, progress count 306 is initialized by host adapter driver 205 to the number of chained SCSI command blocks which can be executing in parallel, and which immediately precede chained SCSI command block 300, i.e., the chained SCSI command block in which progress count 306 resides. When progress count 306 is less than a second predefined value, e.g. a maximum value, progress count 306 is the number of chained SCSI command blocks that have either next block pointer 320 or offshoot block pointer 330 pointing to SCSI command block 300.

As explained above, after the sequencer control block in each SCSI command block 300 completes execution, sequencer 290 typically decrements the progress count in the next SCSI command block pointed to by next block pointer 320 in current SCSI command block 300. If the progress count in the next SCSI command block after being decremented is the minimum value, e.g., zero, sequencer 290 resets hold-off flag 302 in that next SCSI command block and so enables the next SCSI command block for execution.

The progress count mechanism of this invention enables the builder of the chain to create multiple execution paths that all converge at a single SCSI command block. All SCSI command blocks along the multiple execution paths must complete execution before that SCSI command block at the convergence can be enabled for execution. The maximum number of such convergent paths equals the maximum value of the progress count minus one.

Concurrent SCSI command blocks in chain 207, lie along a parallel chain execution path that converges on a single SCSI command block. As explained above, these chained concurrent SCSI command blocks are a string defined by the next block pointers of each of the concurrent SCSI command blocks in the string. The string begins at a first SCSI command block having the concurrent flag set, and ends at a second SCSI command block, after the first SCSI command block having the concurrent flag set, that has the concurrent flag reset, i.e. a last SCSI command block of the string. Each SCSI command block between the first and last SCSI command blocks in the string has the progress count set to a second predefined value that is an illegal value for progress count 306, e.g. a maximum progress count value. The execution of a string of concurrent SCSI command blocks within a chain is described more completely below.

When host adapter driver 205 does not need to utilize the chaining capability of SCSI command block 300, host adapter driver 205 sets chain control byte 310 to zero. When sequencer 290 reads a zero chain control byte 310, sequencer control block 350 is executed in the same manner as in the prior art. Specifically, the execution is enabled directly by host adapter driver 205, and upon completion of the execution of sequencer control block 350, a command complete is sent back to host adapter driver 205. Thus, SCSI command block 300 can function as either an individual unchained SCSI command block or a link in a chain of SCSI command blocks.

When chain control byte 310 is non-zero, SCSI command block 300 has a relation to one or more SCSI command blocks in memory 250 which sequencer 290 must recognize. The information in the chain control block 360 specifies the order of SCSI command block execution to be managed by sequencer 290.

The SCSI command blocks illustrated in FIGS. 4, 6A, 6B, 6C, 7 to 9, 11, 12 and 14 to 17 have a structure identical to that illustrated in FIG. 3. In these Figures, an alphanumeric character, e.g., A to E is used in the reference numeral to identify a particular SCSI command block. The most significant digit of the reference numeral identifies the Figure in which the SCSI command block appears. The remaining digits in the reference numeral identify a particular feature of the SCSI command block, e.g., 10 identifies the chain control byte, 20 identifies the next block pointer, and 30 identifies the offshoot block pointer. A similar convention has been used for the flags and count in the chain control byte. In view of these definitions, the description of FIG. 3 is directly applicable to each of the SCSI control blocks in the other Figures, and so the description is not repeated for each of the different reference numerals.

Figure 4:
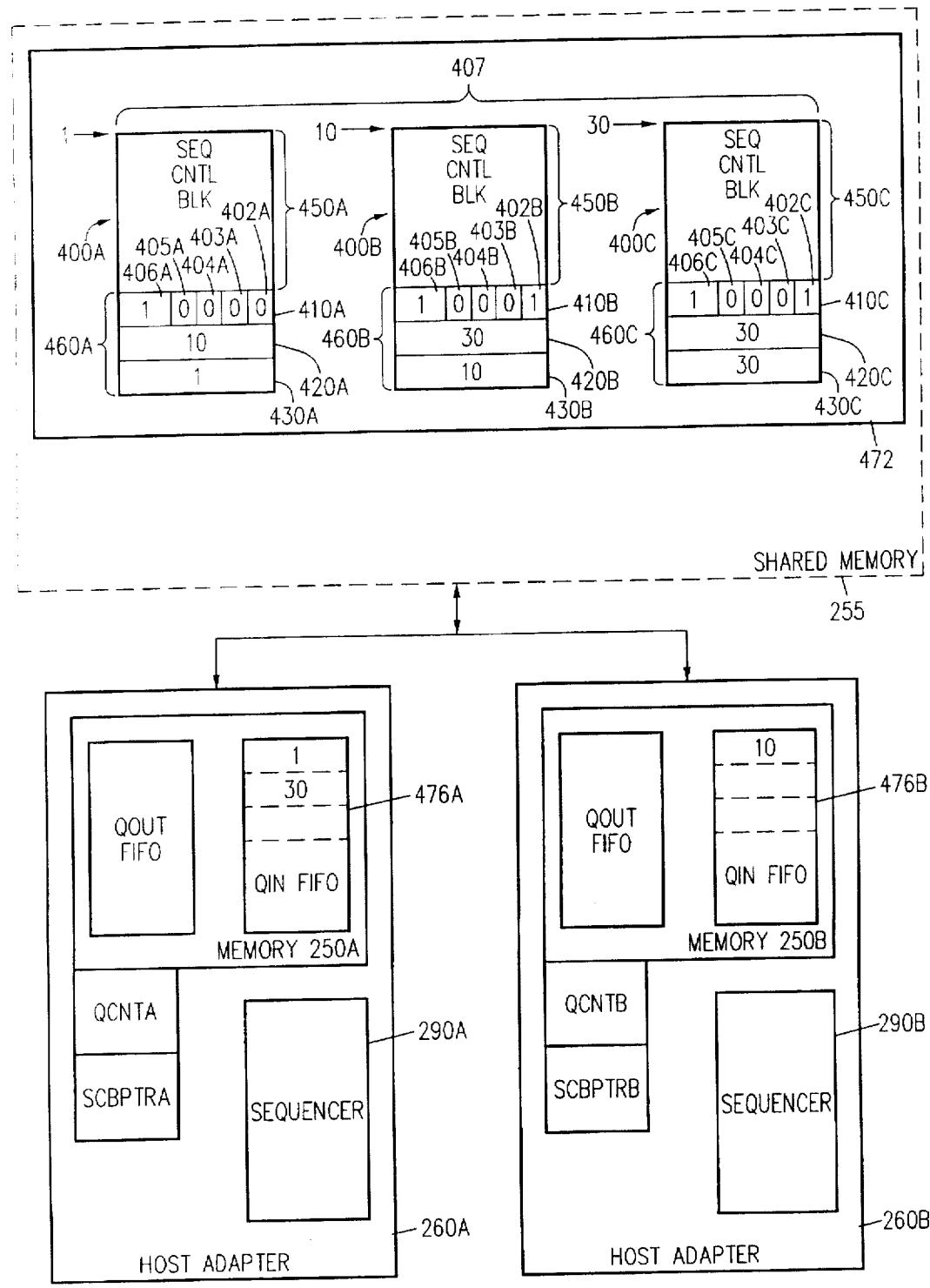
FIG. 4 illustrates three SCSI command blocks of this invention that are linked in a chain that is stored in a memory.

FIG. 4 illustrates three SCSI command blocks 400A, 400B, and 400C that are linked in a chain 407. Initially, host adapter driver 205 builds each of SCSI command blocks 400A to 400C. Host adapter driver 205 determines which of SCSI command blocks 400A to 400C is at the head of chain 407. Recall that one or more SCSI command blocks of this invention can be at the head of a chain. In this embodiment, only SCSI command block 400A is at the head of chain 407. Consequently, host adapter driver 205 sets hold-off flags 402B and 402C in SCSI command blocks 400B and 400C.

respectively, and resets hold-off flag 402A in SCSI command block 400A.

Host adapter driver 205 resets concurrent flags 403A, 403B, and 403C, abort flags 404A, 404B, and 404C, and aborted flags 405A, 405B, and 405C. In the description that follows, concurrent, abort, and aborted flags in each SCSI command block are initialized in this same way unless explicitly stated to the contrary and so this description is not repeated.

Host adapter driver 205 sets progress counts 406A to 406C to one in SCSI command blocks 400A to 400C, respectively. For a SCSI command block that is not in a string of concurrent SCSI command blocks and is not at the head of the chain, e.g., blocks 400B and 400C, the progress count is set to the number of SCSI command blocks that immediately precede the SCSI command block. SCSI command block 400B is immediately preceded by one SCSI command block 400A. Similarly, SCSI command block 400C is immediately preceded by one SCSI command block 400B. This is why host adapter driver 205 sets progress counts 406B and 406C to one. The progress count in a SCSI command block at the head of chain is set to one.

Offshoot block pointers 430A, 430B, and 430C are set to point at the SCSI command block containing the pointer.

When chain 407 is built, host adapter driver 205 loads each SCSI command block in chain 407 in a SCSI command block array 472 in shared memory 255. The particular actions and operations described below are illustrative only and are intended only to illustrate the use of a chain of SCSI command blocks. The particular method and operations used by host adapter driver 205 and host adapters to load and execute the SCSI command blocks from a shared memory are not essential to this invention and depend on the particular host adapters, host computer bus, and host adapter driver utilized. One important aspect is that each host adapter can access the SCSI command blocks within chain 407 as necessary to properly execute chain 407, and that host adapter driver 205 can load chain 407 in memory 255 and can provide all information to the appropriate host adapters for initiation and completion of execution of chain 407.

In one embodiment, host adapter driver 205 sends the SCSI command block to the appropriate host adapter with an address within in the range of addresses for the port of the host adapter connected to memory 255 using a programmable I/O. In FIG. 4, only portions of host adapters 260A and 260B (FIG. 2B) are illustrated for convenience. When the transfer of chain 407 to SCSI command block array 472 is completed, a SCSI command block pointer for each of chained SCSI command blocks 400A, 400B, and 400C is placed in queue-in FIFO 471A of host adapter 260A or in queue-in FIFO 471B of host adapter 260B depending on which host adapter is to execute the corresponding SCSI command block. Specifically, the location within SCSI command block array, i.e., an offset from the base of SCSI command block array 472, is entered in the queue-in FIFO of the appropriate host adapter by host adapter driver 205.

This assumes that host adapter driver 205 can load all blocks in the chain in array 472. If sufficient space is not available for all the blocks, as space becomes available in array 472 a SCSI command block is loaded in memory 255. When all the blocks in chain 407 are loaded in memory 255, host adapter driver 205 enters the pointers in the queue-in FIFOs.

The base address of SCSI command block array 472 is initialized in a SCSI command block array register of each host adapter by host adapter driver 205 at start-up so that the base address is known. Thus, only the offset, i.e., the location within SCSI command block array 472, from the base address of SCSI command block array 472 is required to address an entry in SCSI command block array 472. Thus, each entry in queue-in FIFOs 476A and 476B is referred to as a "SCSI command block pointer," because an entry in queue-in FIFO 476 addresses a location in SCSI command block array 472 Consequently, there is an one-to-one correspondence between a SCSI command block pointer in queue-in FIFO 476A or 476B, and a SCSI command block in SCSI command block array 472.

After the SCSI command block pointers for chain 407 are entered in queue-in FIFOs 476A and 476B, a queue-in counters QCNTA and QCNTB in host adapters 260A and 260B, respectively, are automatically updated. In one embodiment, each of queue-in counters QCNTA and QCNTB is an one byte up-down counter. The value of queue-in counter QCNTA, or QCNTB at any instant represents the number of SCSI command block pointers stored in queue-in FIFO 476A of host adapter 260A and similarly for queue-in FIFO 476B of host adapter 260B. Thus, host adapter driver 205 updates the value of queue-in counters QCNTA and QCNTB by the number of chained SCSI command blocks in chain 407 for each of host adapters 260A and 260B.

If the order of execution of chained SCSI command blocks at the head of a chain is important, host adapter driver 205 loads the SCSI command block pointers into queue-in FIFOs 476A and/or 476B in the desired order. The order of all other SCSI command block pointers, i.e., those to chained SCSI command blocks with the hold-off flag set, is not important because the order of execution is determined by the information in the chain control byte that was initialized by host adapter driver 205.

Execution of a SCSI command block begins after the SCSI command block pointer for that SCSI command block is popped out of queue-in FIFO 476A by sequencer 290A and queue-in counter QCNTA is decremented. Prior to execution, sequencer 290 determines that all conditions are satisfactory for starting execution of the SCSI command block. For example, sequencer 290 determined that hardware is available for sending a command to a SCSI target and the SCSI target is not busy. One way for accessing these conditions in described in copending and commonly assigned in U.S. patent application Ser. No. 08/269,491, filed on Jun. 30, 1994, entitled "A SCB ARRAY EXTERNAL TO A HOST DAPTER INTEGRATED CIRCUIT" of Michael D. Brayton et al. and U.S. patent application Ser. No. 08/269,463, filed on Jun. 30, 1994, entitled "METHOD FOR ACCESSING A SEQUENCER CONTROL BLOCK BY A HOST ADAPTER INTEGRATED CIRCUIT". The state of the hold-off flag for the SCSI command block is another condition that is checked, and must be reset for execution to begin. Alternatively, in another embodiment, the hold-off flag could be eliminated and a pointer would not be placed in the queue-in FIFO until the SCSI command block was ready for execution. If all the conditions for execution including the state of the hold-off flag are not satisfied, sequencer 290A pushes the SCSI command block pointer back into queue-in FIFO 476A to reconsider the SCSI command block later and queue-in counter QCNTA is incremented.

When sequencer 290A is an idle loop, sequencer 290A checks queue-in counter QCNTA for a non-zero value. If queue-in counter QCNTA has a non-zero value, at least one location in queue-in FIFO 476A contains a SCSI command block pointer. Therefore, sequencer 290A retrieves the next SCSI command block pointer in queue-in FIFO 476A and decrements queue-in counter QCNTA.

Consequently, sequencer 290A retrieves pointer one to SCSI command block 400A, which is at the head of chain 407, when sequencer 290 pops the SCSI command block pointer from queue-in FIFO 476A. Assuming the hardware, and target device are available, sequencer 290A checks hold-off flag 402A and determines that hold-off flag 402A is reset. Thus, SCSI command block 400A is ready for execution and so execution of SCSI command block 400A is initiated. SCSI command block pointer one is placed in a SCB pointer register SCBPTRA and execution of sequencer control block 450A continues in a manner analogous to that in the prior art.

Figure 5A:
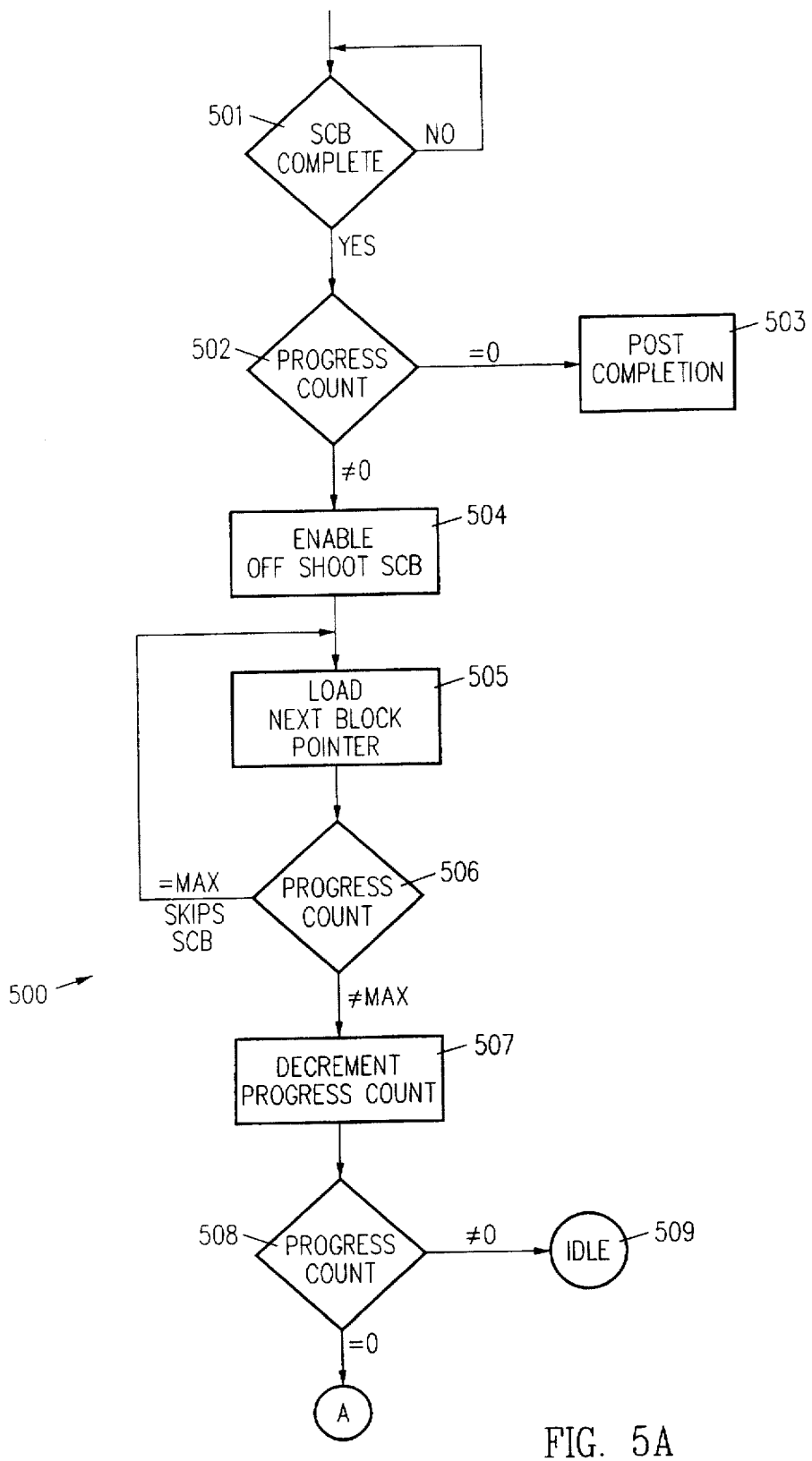
FIGS. 5A and 5B are a process flow diagram for a chain control process that is executed by a host adapter sequencer for each SCSI command block of this invention after the SCSI command in the block is completed.
Figure 5B:
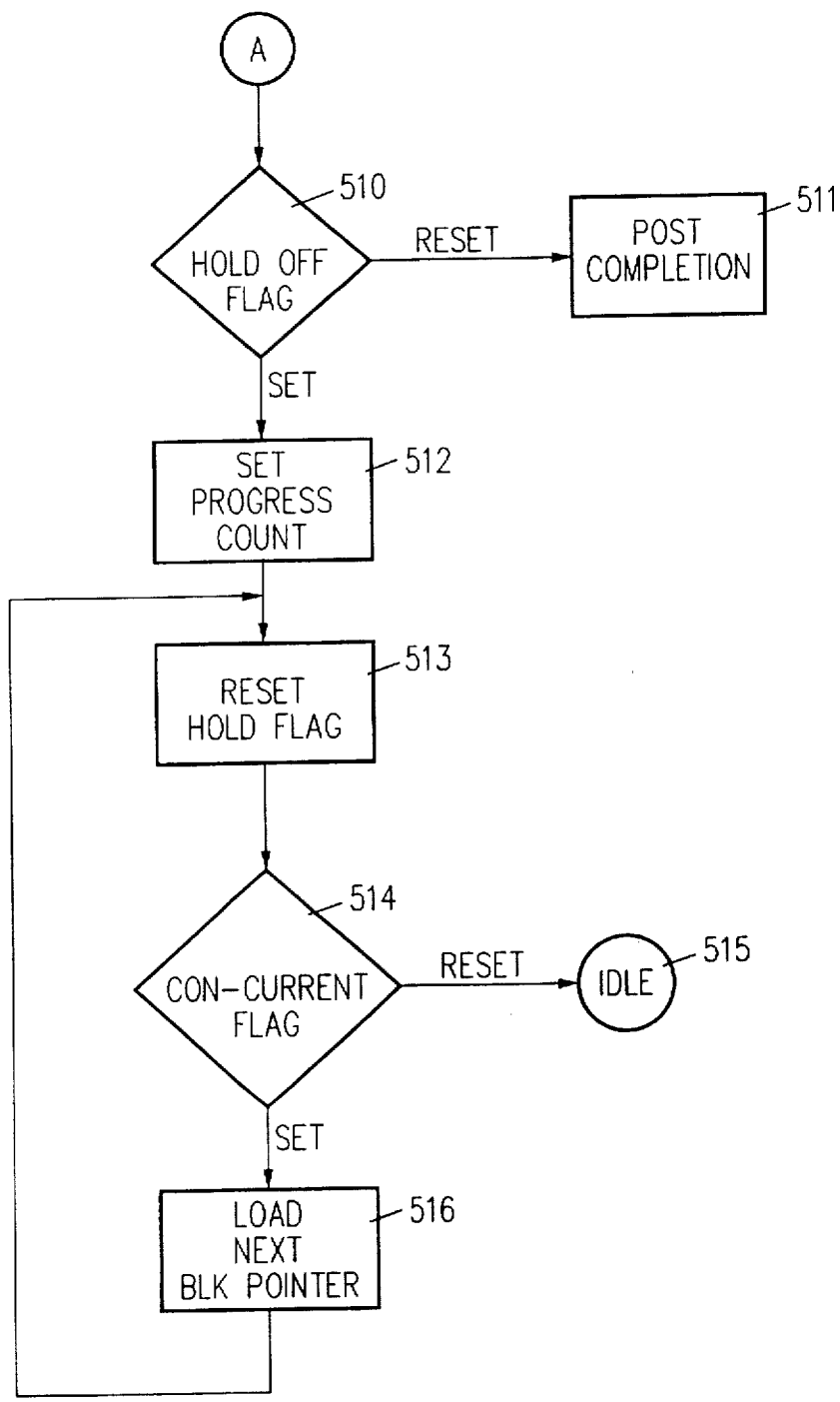

Sequencer control block 450A executes normally until completion. Here, normal means the same as the equivalent prior art sequencer control block 450A without chain control block 460A and with no error condition encountered. At completion of the execution, sequencer 290A uses chain control process 500 (FIGS. 5A and 5B) to determine the action with respect to chain 407, e.g., sequencer 290A executes a chain control manager, sometimes called a chain manager.

SCSI command block complete check 501 checks for completion of execution of a sequencer control block within the SCSI command block. Check 501 appears to be in an idle state until execution is completed. However, those skilled in the art will appreciate that chain control process 500 is a part of the firmware for sequencer 290A and chain control process 500 is executed upon completion of execution of sequencer control block 450A. Consequently, check 501 is used to simply illustrate that chain control process 500 is not initiated until completion of execution of sequencer control block 450A within SCSI command block 400A. Since execution of sequencer control block 450A within SCSI command block 400A is complete, processing transfers from SCSI command block completion check 501 to progress count check 502.

In progress count check 502, sequencer 290A reads progress count 406A from chain control byte 410A. In general, sequencer 290A reads the progress count from the chain control byte of the SCSI command block that completed execution. Herein, the current SCSI command block is the SCSI command block identified by the pointer in SCSI command block pointer register SCBPTRA at the end of execution of sequencer control block 450A. Consequently, an equivalent definition of the operation in check 502 is that sequencer 290A reads the progress count from the chain control byte of the current SCSI command block.

If progress count 406A in current SCSI command block 400A is zero, processing transfers from check 502 to post completion operation 503. In post completion operation 503, a pointer to the last SCSI command block in the chain is posted in a queue-out FIFO and a queue-out counter is automatically incremented. Thus, if either a chain of SCSI command blocks has completed execution, or an unchained SCSI command block has completed execution, the queue-out FIFO and counter are updated and host adapter driver 205 is notified of the completion in post completion operation 503 via an interrupt. Host adapter driver 205 retrieves the pointer in the queue-out FIFO and returns a notice of completion of the chain execution to either a manager or an application.

However, since progress count 406A in current SCSI command block 400A is non-zero, processing transfers from check 502 to enable offshoot SCSI command block operation 504. In enable offshoot SCSI command block operation 504, sequencer 290A reads offshoot block pointer 430A in the chain control block 460A. Sequencer 290A then resets the hold-off flag in the chain control byte of the SCSI command block pointed to by the offshoot block pointer to enable that SCSI command block for execution. Thus, for SCSI command block 400A, sequencer 290A resets hold-off flag 402A. Since SCSI command block 400A has completed execution, this operation is a nullity in this example and in similar situations. Upon completion of enable offshoot SCSI command block operation 504, sequencer 290A transfers processing to load next block pointer operation 505.

In load next block pointer operation 505, sequencer 290 reads next block pointer 420A in chain control block 460A of current SCSI command block 400A and loads next block pointer 420A into SCSI command block pointer register SCBPTRA. Thus, sequencer 290A reads ten from next block pointer 420A and loads the ten into SCSI command block pointer register SCBPTRA. Operation 505 transfers to progress count check 506.

In progress count check 506, sequencer 290A reads progress count 406B from chain control block 460B of next SCSI command block 400B as identified by SCSI command block 400A that just completed execution. As explained above, SCSI command block pointer ten for next SCSI command block 400B was loaded in SCSI command block pointer register SCBPTRA. Consequently, sequencer 290A reads progress count 406B in SCSI command block 400B that is identified by the pointer in SCSI command block pointer register SCBPTRA. If progress count 406B is the maximum value, check 506 returns processing to step 505, that in turn loads next SCSI command block pointer in the SCSI command block identified by the pointer in SCSI command block pointer register SCBPTRA and transfers to progress count check 506. Thus, when the progress count is a maximum value, the SCSI command block containing that value is skipped in the processing following completion of execution of the sequencer control block within the SCSI command block. Thus, a SCSI command block with a progress count set to the maximum value is a skipped SCSI command block, and a SCSI command block with a progress count set to other than the maximum value is an unskipped SCSI command block.

If the progress count is anything other than the maximum allowable count, processing transfers from check 506 to decrement progress count operation 507. In this example, progress count 406B of SCSI command block 400B is one. Thus, check operation 506 transfers to operation 507.

In decrement progress count operation 507, progress count 406B in SCSI command block 400B pointed to by pointer ten in SCSI command block pointer register SCBPTRA is decremented by one to zero. Operation 507 transfers to progress count check 508.

In progress count check 508, if the progress count after being decremented in operation 507 is greater than zero, sequencer 290A returns to the idle loop through idle operation 509 because the necessary operations in chain control process 500 after completion of execution of sequencer control block 450A are complete because SCSI command block 400B is not the next block to be executed in chain 407A. Conversely, since progress count 406B is zero in next SCSI command block 400B, SCSI command block 400B may be the next link in chain 407 to be executed and so processing transfers from progress count check 508 to hold-off flag check 510.

In hold-off flag check 510, hold-off flag 402B in next SCSI command block 400B is checked, i.e., the hold-off flag in the SCSI command block identified by the pointer in SCSI command block pointer register SCBPTRA is checked. If hold-off flag 402B is reset, the execution of the chain is complete and so processing transfers to post completion operation 511 which is identical to post completion operation 503 that was described above. In some situations, the tail of a chain can complete execution prior to one of the earlier links in the chain. This check detects such an occurrence.

Conversely, since hold-off flag 402B in next SCSI command block 400B is set, processing transfers from check 510 to set progress count operation 512. In progress count operation 512, progress count 406B for next SCSI command block 400B is set to one. Processing transfers from operation 512 to reset hold-off flag operation 513.

In reset hold-off flag operation 513, hold-off flag 402B in next SCSI command block 400B is reset so that execution of SCSI command block 400B is enabled. Processing transfers from operation 513 to concurrent flag check 514.

In concurrent flag check 514, the state of concurrent flag 403B in next SCSI command block 400B is checked. If the concurrent flag is reset, processing of sequencer 290A returns to the idle loop through idle operation 515. Conversely, if concurrent flag 403B is set; processing transfers to load next block pointer 516.

In the present example, concurrent flag 403B is reset, and so sequencer 290A returns to the idle loop. Prior to considering the next operation by sequencer 290A, the remaining operations in chain control process 500 are considered for completeness.

In load next block pointer 516, the next block pointer in the SCSI command block identified the pointer by SCSI command block pointer register SCBPTRA is loaded into SCSI command block pointer register SCBPTRA and processing transfers to reset hold-off flag operation 513. Operations 516, 513 and 514 are repeated for each SCSI command block in the chain for which the concurrent flag is set. These operations enable the SCSI command blocks with the concurrent flag set for execution as well as the SCSI command block at the end of the string of concurrent SCSI command blocks, and then the sequencer returns to the idle loop.

When sequencer 290A returns to the idle loop, queue-in counter QCNTA shows that SCSI command blocks remain for execution. Thus, in this example, sequencer 290A pops SCSI command block pointer 30 to SCSI command block 400C off queue-in FIFO 476A. However, hold-off flag 402C is set and one of the conditions necessary for execution of SCSI command block 400C is not met. Consequently, SCSI command block pointer 30 is returned to queue-in FIFO 476A and sequencer 290A returns to the idle state.

Sequencer 290B also has been in the idle loop. Queue-in counter QCNTB shows that SCSI command blocks remain for execution. Thus, in this example, when sequencer 290B popped SCSI command block pointer 10 off queue-in FIFO 476B prior to completion of execution of SCSI command block 400A, hold-off flag 402B was set. Consequently, SCSI command block pointer 10 was returned to queue-in FIFO 476B and sequencer 290B returned to the idle loop.

However, after completion of execution of SCSI command block 400A, when pointer 10 is popped off queue-in FIFO 476B, SCSI command block 400B now has hold-off flag 402B reset and so is ready for execution. Thus, SCSI command block pointer 10 is loaded in SCSI command block pointer register SCBPTRB and execution commenced by sequencer 290B.

This is dramatically different from the prior art process. In the prior art, an interrupt would have been generated after completion of execution of block 400A. Host adapter driver 205, in response to the interrupt would have transferred block 400B and configured host adapter 260B to execute block 400B. In contrast, host adapters 260A and 260B determined which block to execute next and the interrupt indicating completion of block 400A has been eliminated.

When execution of sequencer control block 450B in SCSI command block 400B is complete, chain control process 500 is initiated by sequencer 290B. Notice that control byte 410B is identical to control byte 410A. Thus, operations in chain control process 500 performed by sequencer 290B using control byte 410B are similar to those described above when the difference in next block pointer 420B and offshoot block pointer 430B are considered. Thus, the description of the operations in chain control process 500 is not repeated and the previous description of the operations in chain control process 500 is incorporated herein by reference. As a result of chain control process 500 for SCSI command block 400B, SCSI command block 400C is enabled for execution.

As described above, sequencer 290A also has been in the idle loop, because SCSI command block 400C was not ready for execution. However, after completion of execution of SCSI command block 400B, when pointer 30 is popped off queue-in FIFO 476A, SCSI command block 400C now has hold-off flag 402C reset and so is ready for execution. Thus, SCSI command block pointer 30 is loaded in SCSI command block pointer register SCBPTRA and execution commenced by sequencer 290A.

After completion of execution of sequencer control block 450C, sequencer 290A initiates chain control process 500. Sequencer 290A progresses through to check 510 in a manner similar to that described above. However, hold-off flag 402C is reset and so hold-off flag check 510 transfers to post completion operations 511 in which host adapter driver 205 is notified of completion of execution of chain 407.

Thus, although these SCSI command blocks have executed, only a single interrupt is sent to host adapter driver 205.

In chain control process 500, the decrement of a progress count in operation 507 is followed by an observation of the value of the progress count in check 508. If the value of the progress count is zero, subsequent action is taken in chain control process 500. If the value of the progress count is not zero, no subsequent action is taken and chain control process 500 returns the sequencer to an idle loop. Normally, a sequencer would test the progress count for zero by testing that all of its bits are zero. This 5 observation works when a chain of SCSI command blocks is confined to a single host adapter. It may not work when the SCSI command blocks are chained across multiple host adapters which share a common SCSI command block array 472.

For example, when SCSI command block array 472 is shared by two host adapters as in FIG. 4, e.g., host adapter one and host adapter two, host adapter one must assume that host adapter two can access a SCSI command block in between any two consecutive accesses of that SCSI command block by host adapter one. When host adapter one decrements a progress count in a SCSI command block and then tests for a zero value, host adapter one must make two separate accesses of the SCSI command block containing the count: one to decrement 20 the count; the other to test for zero. In between these accesses, host adapter two could access the same SCSI command block and decrement the count. There is therefore the possibility that when host adapter two decrements the count to zero, host adapter one also observes the zero value. In this situation, host adapter one has observed an erroneous progress count, because the result of its decrement was non-zero. As a result, both host adapters conclude that they have decremented the progress count to zero, and consequently one of the host adapters performs an extraneous operation.

This race condition between two host adapters can be eliminated if a carry flag is used instead of the zero flag for observing the progress count value following a decrement. The carry flag is defined by the same sequencer instruction that executes the decrement. Therefore, both the decrement and observation of the carry flag can be made in a single SCSI command block access. The carry flag can be tested by a subsequent instruction to determine if the count was decremented to zero. This prevents the decrement result from being corrupted by another host adapter because only one host adapter detects the carry flag, i.e. the host adapter that decrements the progress count to zero.

The progress count bits in the chain control byte have been defined such as to allow the carry flag to be used to test the result of a decrement for zero value. As explained above, the progress count bits are actually the two's complement of the negative of the progress count. The progress count is decremented by adding one to the two's complement value and the progress count is located at the most significant end of the chain control byte, so that when the count is decremented to zero, the carry flag is set.

Prior to considering more complex examples in the context of RAID operations, several additional definitions and examples are presented to demonstrate the use of chained SCSI command blocks. According to the principles of this invention there are several types of SCSI command blocks. First, as indicated above, a SCSI command block can be chained or unchained. These types are mutually exclusive. However, a SCSI command block in a chain can be one of several types. Further, a single SCSI command block in a chain, in some instances, can have multiple types.

Figure 6A:
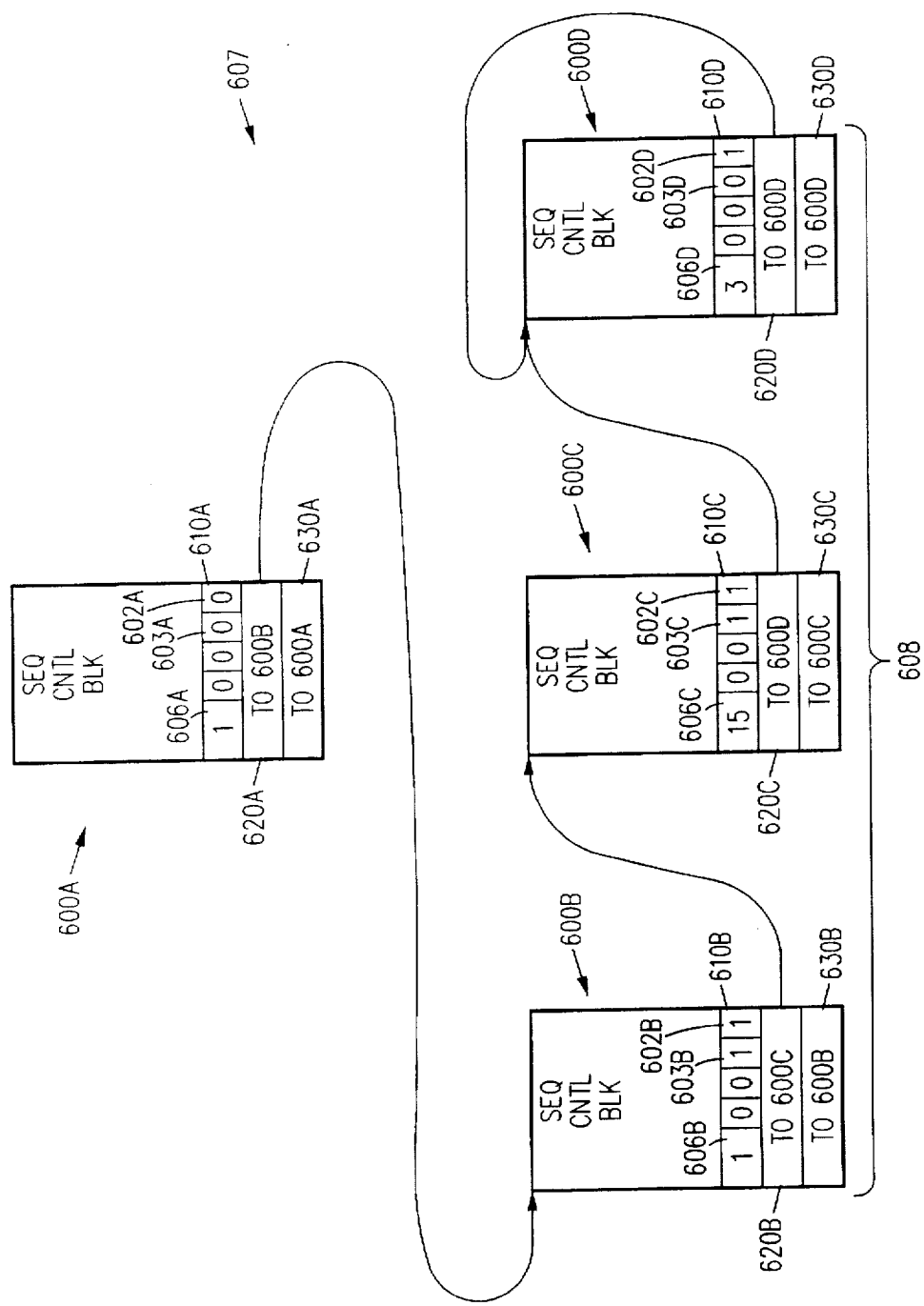
FIG. 6A is an example of a chain, according to the principles of this invention that includes three concurrent SCSI command blocks in a string.

As indicated above, one type of chained SCSI command blocks is concurrent SCSI command blocks. SCSI command blocks, which lie along the same chain path and are simultaneously enabled to execute, are classified as concurrent SCSI command blocks. FIG. 6A is an example of a chain 607 that includes three concurrent SCSI command blocks 600B to 600D in a string 608. A string of concurrent SCSI command blocks, as used in herein, refers to a string of contiguous SCSI command blocks which are simultaneously enabled to execute, and which all lie along the same chain path.

Other SCSI command blocks on other chain paths may also happen to be executing at the same time, but are not considered to be "concurrent" with SCSI command blocks on the string. Also, SCSI command blocks pointed to by the next SCSI command block and offshoot SCSI command block pointers in the previous SCSI command block are not considered to be concurrent in this context, even though both the execution of the next SCSI command block and the offshoot SCSI command block may be enabled at the completion of the previous SCSI command block.

In FIG. 6A, SCSI command block 600A can be either a head of chain 607, or simply a SCSI command block within chain 607. The exact configuration of SCSI command block 600A is not essential to the discussion of concurrent SCSI command blocks 600B to 600D. The important aspect is that next block pointer 620A addresses SCSI command block 600B as indicated in FIG. 6A. In this and subsequent examples, the steps in the execution of the sequencer control block within a SCSI command block by a sequencer in a particular host adapter are not considered. The initial processing, with the exception of the hold-off flag checking, and the subsequent execution, with the exception of the abort process, are the same as in the prior art.

In this example, host adapter driver 205 sets hold-off flags 602B to 602D. As explained above, host adapter driver 205 also sets the concurrent flag for all SCSI command blocks in string 608, i.e. flags 603B and 603C, except last SCSI command block 600D. Thus, host adapter driver 205 sets concurrent flags 603B and 603C and resets concurrent flag 603D.

Host adapter driver 205 also places the appropriate progress count in each of progress counts 606B to 606D. As explained above for a SCSI command block at the head of a chain, the progress count is set to one. For a non-concurrent SCSI command block in the middle of a chain, or the first concurrent SCSI command block in a string of concurrent SCSI command blocks, e.g. SCSI command block 600B, the progress count is set to the number of SCSI command blocks immediately preceding that SCSI command block. The immediately preceding SCSI command blocks can be on different paths which converge on that SCSI command block. If an immediately preceding SCSI command block is the last in a string of concurrent SCSI command blocks, the progress count includes all SCSI command blocks in the string.

In other words, the progress count is initialized to the sum of the following for a non-concurrent SCSI command block in the middle of a chain, or for the first concurrent SCSI command block in a string of concurrent SCSI command blocks:

a.) the number of non-concurrent SCSI command blocks immediately preceding the SCSI command block; and b.) the total number of concurrent SCSI command blocks in strings which end just ahead of the SCSI command block. For example, if a SCSI command block is immediately preceded by three converging strings of four concurrent SCSI command blocks each, and a non-concurrent SCSI command block on yet another path, the progress count is initialized to thirteen.

Since the exact details of chain 607 are not being considered, an initial progress count is not defined for SCSI command block 600A. As indicated above in chain control process 500, progress count 600A is zero upon completion of execution of SCSI command block 60GA.

Concurrent SCSI command block 600B is the first block in string 608 and is immediately preceded by only block 600A. Thus, host adapter driver 205 sets progress count 606B to one.

For a concurrent SCSI command block that is not the first SCSI command block in a string of concurrent SCSI command blocks or the last SCSI command block of the chain, the progress count is set to the maximum count, e.g., 15. Thus, progress counts 606C is set to a maximum value by host adapter driver 205, which is fifteen in this embodiment.

For a SCSI command block at the end of a chain, the progress count is initialized to the sum of the following:

a.) the number of non-concurrent SCSI command blocks immediately preceding the SCSI command block;

b.) the total number of concurrent SCSI command blocks in strings immediately preceding the SCSI command block; and c.) the number '1' if the SCSI command block is part of a string of concurrent SCSI command blocks. Thus, since concurrent SCSI command block 600D is at the end of chain 607, progress count 606D is set to three, i.e. the total number of concurrent SCSI command blocks in string 608 immediately preceding SCSI command block 600D plus one.

In this example, the offshoot block pointers are not used. Thus, each offshoot block pointer is set to address the SCSI command block containing the offshoot block pointer. In a string of concurrent SCSI command blocks, the next block pointers point down the concurrent SCSI command block string, i.e. from the first SCSI command block in the concurrent SCSI command block string to the last SCSI command block in the concurrent SCSI command block string. Thus, for FIG. 6, next block pointer 620B points to SCSI command block 600C, and next block pointer 620C points to SCSI command block 600D.

Figure 6B:
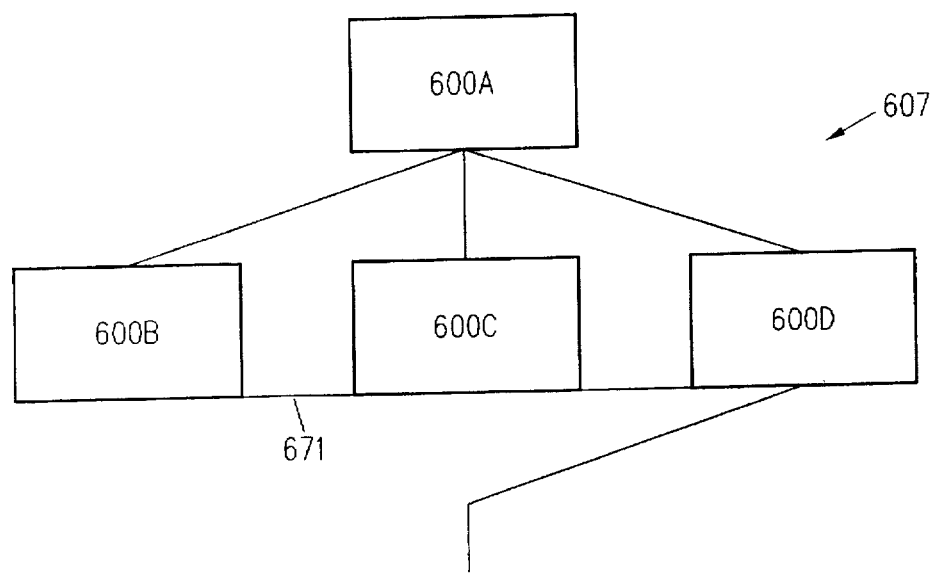
FIGS. 6B and 6C are alternative execution flow diagrams for a string of concurrent SCSI command blocks within a chain of SCSI command blocks where the last block in the string is also the last block in the chain.
Figure 6C:
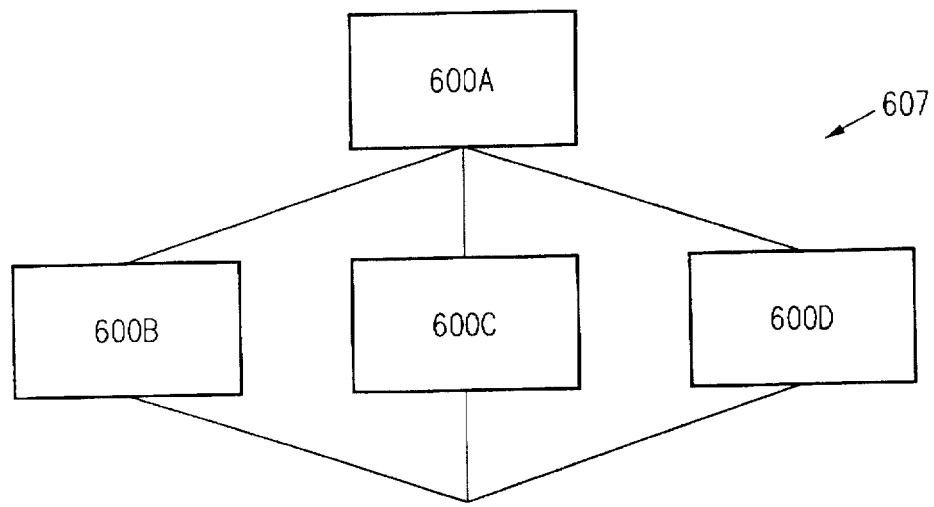

FIGS. 6B and 6C are alternative execution flow diagrams for concurrent SCSI command blocks 600B to 600D in a chain 607 of concurrent SCSI command blocks. Concurrent SCSI command blocks 600B to 600D are drawn in parallel at the same level in an execution flow diagram. The chain execution path in FIG. 6B starts at the completion of SCSI command block 600A and shows the successive execution enabling of SCSI command blocks 600B to 600D. Path 671 is drawn along the bottoms of SCSI command blocks 600B to 600D to show that these SCSI command blocks lie along the same chain path, and also to suggest for example that initiation of execution of SCSI command block 600D does not have to wait for execution of SCSI command blocks 600B and 600C to complete. Path 671 is also intended to suggest that SCSI command blocks 600B to 600D are enabled in sequence by sequencer 290.

FIG. 6B was drawn with a single chain execution path at the bottom of three concurrent SCSI command blocks 600B to 600D to illustrate the sequence of enabling concurrent SCSI command blocks.

From the point of view of how SCSI command block execution is sequenced through a chain, it is not necessary to know exactly how concurrent SCSI command blocks are enabled. It is sufficient to know that they are enabled simultaneously. Another way of drawing concurrently executing SCSI command blocks is shown in FIG. 6C. Concurrency is indicated by three execution paths radiating from a common point of SCSI command block 600A to the tops of three concurrent SCSI command blocks 600B to 600D. This path structure is be used hereafter in chain flow execution diagrams.

Returning to FIG. 6A, when sequencer control block 650A completes execution, chain control process 500 is again initiated. The process goes through check 501, check 503, operation 504 to load next block pointer operation 505. Next block pointer 620A of SCSI command block 600A points to SCSI command block 600B that is the start of the string of concurrent SCSI command blocks. Next block pointer 620A is loaded in SCSI command block pointer register SCBPTR in operation 505.

Note that the definition of a start and an end of a concurrent SCSI command block string is necessary only for configuring the information in the chain control blocks of the concurrent SCSI command blocks. The start and end of the concurrent SCSI command block string has nothing to do with the execution of the concurrent SCSI command block string.

As explained above, progress count 606B is not the maximum and so processing transfers from operation 505 through check 506 to decrement progress count operation 507 which in turn decrements progress count 606B to zero and transfers to progress count check 508.

Since progress count 606B is zero, check 508 transfers processing to hold-off flag check 510. Since hold-off flag 602B is set, processing transfers through check 510 to set progress count operation 512 which in turn sets progress count 606B to one. Operation 512 transfers to reset hold-off flag operation 513.

In reset hold-off flag operation 513, hold-off flag 602B is reset in SCSI command block 600B and processing transfers to concurrent flag check 514. Concurrent flag 603B of SCSI command block 600B is set and so check 514 transfers to load next block pointer operation 516.

In next block pointer operation 516, next block pointer 620B, that points to SCSI command block 600C, is loaded in SCSI command block pointer register SCBPTR. Operation 516 transfers processing to reset hold flag operation 513.

In this pass through reset hold-off flag operation 513, hold-off flag 602C is reset in SCSI command block 600C and processing transfers to concurrent flag check 514. Concurrent flag 603C of SCSI command block 600C is set and so check 514 transfers to load next block pointer operation 516.

In next block pointer operation 516, next block pointer 620C, that points to SCSI command block 600D, is loaded in SCSI command block pointer register SCBPTR. Operation 516 transfers processing to reset hold flag operation 513.

In this pass through reset hold-off flag operation 513, hold-off flag 602D is reset in SCSI command block 600D and processing transfers to concurrent flag check 514. Concurrent flag 603D of SCSI command block 600D is reset and so check 514 transfers to idle 515.

Thus, when SCSI command block 600A completes execution, SCSI command blocks 600B to 660D, the SCSI command blocks in the concurrent SCSI command block string, are each enabled for execution. The enabling sequence for concurrent SCSI command blocks within chain control process 500, i.e. operations 513 and 516 and check 514, is executed very fast compared with the execution time of a SCSI command block. Consequently, concurrent SCSI command blocks 600B to 600D can be considered to be enabled simultaneously. In general SCSI command blocks lying along the same chain path and simultaneously enabled to execute are considered to be concurrently executing SCSI command blocks.

Table 1 gives the state of progress count, concurrent flag, and hold-off flag for each of SCSI command blocks 600B to 600D after completion of chain control process 500 following execution of SCSI command block 600A. Notice that SCSI command block 600A is not included in Table 1. After a SCSI command block 600A completes execution, block 600A is not considered in the subsequent execution of any of the command blocks in chain 607

TABLE 1

| SCSI CMD BLK | Next Block Pointer | Hold-off Flag | Concurrent Flag | Progress Count |
|---|---|---|---|---|
| \multicolumn{5}{l}{STATE OF CHAIN CONTROL BLOCK AFTER COMPLETION OF EXECUTION OF SCSI COMMAND BLOCK 600A} | | | | |
| 600B | TO 600C | 0 | 1 | 1 |
| 600C | TO 600D | 0 | 1 | MAX |
| 600D | TO 600D | 0 | 0 | 3 |

In this example, SCSI command blocks 600B to 600D are enabled to execute at the same time, but in general, execution of SCSI command blocks 600B to 600D completes at different times and in an indeterminant order. All three SCSI command blocks 600B to 600D must complete before chain completion is posted back to host adapter driver 205. For purposes of an example, it is assumed that execution of SCSI command block 600D completes first; execution of SCSI command block 600B completes second; and execution of SCSI command block 600C completes last. This order is illustrative only. The particular sequence of completion of execution is not important and the same result is obtained independent of the completion sequence.

Since by definition SCSI command block 600D is at the end of chain 607, next SCSI command block pointer 620D points to SCSI command block 600D. Upon completion of execution, the sequencer, that executed the sequencer control block in SCSI command block 600D, enters chain control process 500 and check 501 transfers to progress count check 502. As shown in Table 1, progress count 606D is three. Thus, progress count check 502 transfers processing to enable offshoot operation 504 which in turn transfers to load next block pointer operation 505.

As shown in Table 1, next block pointer 620D of SCSI command block 600D points to SCSI command block 600D. Consequently, operation 505 loads a pointer to SCSI command block 600D in register SCBPTR and transfers processing to progress count check 506.

Since progress count 606D is not the maximum value, check 506 transfers directly to decrement progress count operation 507. In operation 507, the sequencer decrements progress count 606D from 3 to 2 and transfers to progress count check 508. Progress count 606D is not zero because either SCSI command block 600B, SCSI command block 600C or both have not completed execution. If progress 600D is zero at this point, execution of chain 607 is complete. Since progress count 60OD is greater than zero, progress count check 508 transfers to idle 509 which completes chain control process 500 for SCSI command block 600D.

Table 2 gives the state of progress count, concurrent flag, and hold-off flag for each of SCSI command blocks 600B to 600D after completion of chain control process 500 following execution of SCSI command block 600D.

TABLE 2

STATE OF CHAIN CONTROL BLOCK
AFTER COMPLETION OF EXECUTION OF
SCSI COMMAND BLOCK 600D

| SCSI CMD BLK | Next Block Pointer | Hold-off Flag | Concurrent Flag | Progress Count |
|---|---|---|---|---|
| 600B | TO 600C | 0 | 1 | 1 |
| 600C | TO 600D | 0 | 1 | MAX |
| 600D | TO 600D | 0 | 0 | 2 |

Upon completion of execution of sequencer control block 650B in SCSI command block 600B, the sequencer, that executed sequencer control block 650B, enters chain control process 500 and check 501 transfers to progress count check 502. As shown in Table 2, progress count 606B is one. Thus, progress count check 502 transfers processing to enable offshoot operation 504 which in turn transfers to load next block pointer operation 505.

As shown in Table 2, next block pointer 620B of SCSI command block 600B points to SCSI command block 600C. Consequently, operation 505 loads a pointer to SCSI command block 600C in register SCBPTR and transfers processing to progress count check 506.

Since progress count 606C is the maximum value, check 506 returns to load next block pointer operation 505. As shown in Table 2, next block pointer 620C of SCSI command block 600C points to SCSI command block 600D. Consequently, operation 505 loads a pointer to SCSI command block 600D in register SCBPTR and transfers processing to progress count check 506.

Since progress count 606D is not the maximum value, check 506 transfers directly to decrement progress count operation 507. In operation 507, the sequencer decrements progress count 606D from 2 to 1 and transfers to progress count check 508. Progress count 606D is not zero because 600C has not completed execution. Since progress count 600D is greater than zero, progress count check 508 transfers to idle 509 which completes chain control process 500 for SCSI command block 60OD.

Table 3 gives the state of progress count, concurrent flag, and hold-off flag for each of SCSI command blocks 600B to 600D after completion of chain control process 500 following execution of SCSI command block 600B.

TABLE 3

STATE OF CHAIN CONTROL BLOCK
AFTER COMPLETION OF EXECUTION OF
SCSI COMMAND BLOCK 600B

| SCSI CMD BLK | Next Block Pointer | Hold-off Flag | Concurrent Flag | Progress Count |
|---|---|---|---|---|
| 600B | TO 600C | 0 | 1 | 1 |
| 600C | TO 600D | 0 | 1 | MAX |
| 600D | TO 600D | 0 | 0 | 1 |

Notice that in chain control process 500, check 506 and operation 505 effectively skips over each SCSI command block that has a progress count equal to the maximum. Herein, a skipped SCSI command block is defined as a SCSI command block located in a string of concurrent SCSI command blocks that is not the first SCSI command block in the concurrent SCSI command block string and is not the last SCSI command block in the chain. A skipped SCSI command block has a progress count equal to the maximum count. Non-skipped SCSI command blocks, sometimes called unskipped SCSI command blocks, have progress counts less than the maximum count. First and last SCSI command blocks 600B and 600D in concurrent string 607 are non-skipped type SCSI command blocks, because block 600D is also the end of chain 607. Skipped SCSI command blocks provide a mechanism for allowing the progress count of a single SCSI command block to be used to determine when all SCSI command blocks in the string have been executed.

Returning to the execution of SCSI command block chain 607, upon completion of execution of sequencer control block 650C in SCSI command block 600C, the sequencer, that executed sequencer control block 650C, enters chain control process 500 and check 501 transfers to progress count check 502. As shown in Table 3, progress count 606C is the maximum. Thus, progress count check 502 transfers processing to enable offshoot operation 504 which in turn transfers to load next block pointer operation 505.

As shown in Table 3, next block pointer 620C of SCSI command block 600C points to SCSI command block 600D. Consequently, operation 505 loads a pointer to SCSI command block 600D in register SCBPTR and transfers processing to progress count check 506.

Since progress count 606D is not the maximum value, check 506 transfers directly to decrement progress count operation 507. In operation 507, the sequencer decrements progress count 606D from 1 to 0 and transfers to progress count check 508. Since execution of all the SCSI command blocks in chain 607 has completed, progress count 606D is zero. Thus, progress count check 508 transfers to hold-off flag check 510.

As shown in Table 3, hold-off flag 603D is reset. Thus, hold-off flag check 510 transfers to post completion operation 511. Post completion operation 511 posts complete of execution of chain 607 with host adapter driver 205 and chain control process 500 is terminated.

Chain 707 (FIG. 7) is similar to chain 607 in that both chains 607 and 707 includes a string 608 and 708 of three concurrent SCSI command blocks. However, SCSI command block 700D, that is the end of string 708 is not also the end of chain 707. Rather, SCSI command block 700D is linked to SCSI command block 700E.

Thus, SCSI command blocks 700A to 700C and the generation of these blocks are identical to SCSI command blocks 600A to 600C, respectively and the description of blocks 600A to 600C is incorporated herein by reference for blocks 700A to 700C. SCSI command block 700D is not the end of the chain. As indicated above, for a concurrent SCSI command block, such as block 700D that is not the first SCSI command block in a string of concurrent SCSI command blocks or the last SCSI command block of the chain, the progress count is set to the maximum count. Thus, host adapter driver 205 sets progress count 706D to the maximum count. SCSI command block 700E is not in string 708, and so progress count 706E is set by host adapter driver 205 to the total number of concurrent SCSI command blocks in string 708 that immediately precede SCSI command block 700E, i.e., three.

When sequencer control block 750A completes execution, chain control process 500 is again initiated. Chain control process 500 goes through check 501, check 503, operation 504 to load next block pointer operation 505. Next block pointer 720A of SCSI command block 700A points to SCSI command block 700B that is the start of string of concurrent SCSI command blocks 708. Next block pointer 720A is loaded in SCSI command block pointer register SCBPTR in operation 505.

As explained above, progress count 706B is not the maximum and so processing transfers from operation 505 through check 506 to decrement progress count operation 507 which in turn decrements progress count 706B to zero and transfers to progress count check 508.

Since progress count 706B is zero, check 508 transfers processing to hold-off flag check 510. Since hold-off flag 702B is set, processing transfers through check 510 to set progress count operation 512 which in turn sets progress count 706B to one. Operation 512 transfers to reset hold-off flag operation 513.

In reset hold-off flag operation 513, hold-off flag 702B is reset in SCSI command block 700B and processing transfers to concurrent flag check 514. Concurrent flag 703B of SCSI command block 700B is set and so check 514 transfers to load next block pointer operation 516.

In next block pointer operation 516, next block pointer 720B, that points to SCSI command block 700C, is loaded in SCSI command block pointer register SCBPTR. Operation 516 transfers processing to reset hold flag operation 513.

In this pass through reset hold-off flag operation 513, hold-off flag 702C is reset in SCSI command block 700C and processing transfers to concurrent flag check 514. Concurrent flag 703C of SCSI command block 700C is set and so check 514 transfers to load next block pointer operation 516.

In next block pointer operation 516, next block pointer 720C, that points to SCSI command block 700D, is loaded in SCSI command block pointer register SCB. Operation 516 transfers processing to reset hold flag operation 513.

In this pass through reset hold-off flag operation 513, hold-off flag 702D is reset in SCSI command block 700D and processing transfers to concurrent flag check 514. Concurrent flag 703D of SCSI command block 700D is reset and so check 514 transfers to idle 515.

Thus, when SCSI command block 700A completes execution, SCSI command blocks 700B to 700D, the SCSI command blocks in concurrent SCSI command block string 709, are each enabled for execution. Table 4 gives the state of progress count, concurrent flag, and hold-off flag for each of SCSI command blocks 700B to 700E after completion of chain control process 500 following execution of SCSI command block 700A.

TABLE 4

STATE OF CHAIN CONTROL BLOCK AFTER COMPLETION OF EXECUTION OF SCSI COMMAND BLOCK 700A

| SCSI CMD BLK | Next Block Pointer | Hold-off Flag | Concurrent Flag | Progress Count |
|---|---|---|---|---|
| 700B | TO 700C | 0 | 1 | 1 |
| 700C | TO 700D | 1 | MAX | |
| 700D | TO 700E | 0 | 0 | MAX |
| 700E | TO 700E | 1 | 0 | 3 |

For purposes of an example, it is assumed again that execution of SCSI command block 700D completes first; execution of SCSI command block 700B completes second; and execution of SCSI command block 700C completes last.

SCSI command block 700D is at the end of string 708, and next SCSI command block pointer 720D points to SCSI command block 700E. Upon completion of execution, the sequencer, that executed sequencer control block 750D in SCSI command block 700D, enters chain control process 500 and check 501 transfers to progress count check 502. As shown in Table 4, progress count 707D is the maximum. Thus, progress count check 502 transfers processing to enable offshoot operation 504 which in turn transfers to load next block pointer operation 505.

As shown in Table 4, next block pointer 720D of SCSI command block 700D points to SCSI command block 700E. Consequently, operation 505 loads a pointer to SCSI command block 700E in register SCBPTR and transfers processing to progress count check 506.

Since progress count 706E is not the maximum value, check 506 transfers directly to decrement progress count operation 507. In operation 507, the sequencer decrements progress count 706E from three to two and transfers to progress count check 508. Progress count 706E is not zero because either SCSI command block 700B, or SCSI command block 700C, or both of the blocks have not completed execution. Since progress count 700E is greater than zero, progress count check 508 transfers to idle 509 which completes chain control process 500 for SCSI command block 700D.

Table 5 gives the state of progress count, concurrent flag, and hold-off flag for each of SCSI command blocks 700B to 700E after completion of chain control process 500 following execution of SCSI command block 700D.

TABLE 5

STATE OF CHAIN CONTROL BLOCK
AFTER COMPLETION OF EXECUTION OF
SCSI COMMAND BLOCK 700D

| SCSI CMD BLK | Next Block Pointer | Hold-off Flag | Concurrent Flag | Progress Count |
|---|---|---|---|---|
| 700B | TO 700C | 0 | 1 | 1 |
| 700C | TO 700D | 0 | 1 | MAX |
| 700D | TO 700E | 0 | 0 | MAX |
| 700E | TO 700E | 1 | 0 | 2 |

Upon completion of execution of sequencer control block 750B in SCSI command block 700B, the sequencer, that executed sequencer control block 750B, enters chain control process 500 and check 501 transfers to progress count check 502. As shown in Table 5, progress count 706B is one. Thus, progress count check 502 transfers processing to enable offshoot operation 504 which in turn transfers to load next block pointer operation 505.

As shown in Table 5, next block pointer 720B of SCSI command block 700B points to SCSI command block 700C. Consequently, operation 505 loads a pointer to SCSI command block 700C in register SCBPTR and transfers processing to progress count check 506.

Since progress count 706C is the maximum value, check 506 returns to load next block pointer operation 505. As shown in Table 5, next block pointer 720C of SCSI command block 700C points to SCSI command block 700D. Consequently, operation 505 loads a pointer to SCSI command block 700D in register SCBPTR and transfers processing to progress count check 506.

Since progress count 706D also is the maximum value, check 506 returns to load next block pointer operation 505. As shown in Table 5, next block pointer 720D of SCSI command block 700D points to SCSI command block 700E. Consequently, operation 505 loads a pointer to SCSI command block 700E in register SCBPTR and transfers processing to progress count check 506.

Since progress count 706E is not the maximum value, check 506 transfers directly to decrement progress count operation 507. In operation 507, the sequencer decrements progress count 706E from two to one and transfers to progress count check 508. Progress count 706D is not zero because SCSI command block 700C has not completed execution. Since progress count 700E is greater than zero, progress count check 508 transfers to idle 509 which completes chain control process 500 for SCSI command block 700B.

Table 6 gives the state of progress count, concurrent flag, and hold-off flag for each of SCSI command blocks 700B to 700E after completion of chain control process 500 following execution of SCSI command block 700B.

TABLE 6

STATE OF CHAIN CONTROL BLOCK
AFTER COMPLETION OF EXECUTION OF
SCSI COMMAND BLOCK 700B

| SCSI CMD BLK | Next Block Pointer | Hold-off Flag | Concurrent Flag | Progress Count |
|---|---|---|---|---|
| 700B | TO 700C | 0 | 1 | 1 |
| 700C | TO 700D | 0 | 1 | MAX |

TABLE 6-continued

STATE OF CHAIN CONTROL BLOCK
AFTER COMPLETION OF EXECUTION OF
SCSI COMMAND BLOCK 700B

| SCSI CMD BLK | Next Block Pointer | Hold-off Flag | Concurrent Flag | Progress Count |
|---|---|---|---|---|
| 700D | TO 700E | 0 | 0 | MAX |
| 700E | TO 700E | 1 | 0 | 1 |

Upon completion of execution of sequencer control block 750C in SCSI command block 700C, the sequencer, that executed sequencer control block 750C, enters chain control process 500 and check 501 transfers to progress count check 502. As shown in Table 6, progress count 706C is the maximum. Thus, progress count check 502 transfers processing to enable offshoot operation 504 which in turn transfers to load next block pointer operation 505.

As shown in Table 6, next block pointer 720C of SCSI command block 700C points to SCSI command block 700D. Consequently, operation 505 loads a pointer to SCSI command block 700D in register SCBPTR and transfers processing to progress count check 506.

Since progress count 706D is the maximum value, check 506 returns to load next block pointer operation 505. As shown in Table 6, next block pointer 720D of SCSI command block 700D points to SCSI command block 700E. Consequently, operation 505 loads a pointer to SCSI command block 700E in register SCBPTR and transfers processing to progress count check 506.

Since progress count 706E is not the maximum value, check 506 transfers directly to decrement progress count operation 507. In operation 507, the sequencer decrements progress count 706E from one to zero and transfers to progress count check 508. Since execution of all the SCSI command blocks in chain 707 has completed, progress count 706E is zero. Thus, progress count check 508 transfers to hold-off flag check 510.

As shown in Table 6, hold-off flag 703E is set and so hold-off flag check 510 transfers to set progress count 512 operation. Set progress count operation 706E changes progress count 700E to one and transfers to reset hold-off flag operation 513.

Reset hold-off flag operation 513 resets hold-off flag 702E and transfers to concurrent flag check 514 which in turn transfers to idle 515, which completes chain control process 500 for SCSI command block 700D.

Table 7 gives the state of progress count, concurrent flag, and hold-off flag for each of SCSI command blocks 700B to 700E after completion of chain control process 500 following execution of SCSI command block 700C.

TABLE 7

STATE OF CHAIN CONTROL BLOCK
AFTER COMPLETION OF EXECUTION OF
SCSI COMMAND BLOCK 700C

| SCSI CMD BLK | Next Block Pointer | Hold-off Flag | Concurrent Flag | Progress Count |
|---|---|---|---|---|
| 700B | TO 700C | 0 | 1 | 1 |
| 700C | TO 700D | 0 | 1 | MAX |
| 700D | TO 700E | 0 | 0 | MAX |
| 700E | TO 700E | 0 | 0 | 1 |

Upon completion of execution of sequencer control block 750E in SCSI command block 700E, the sequencer, that executed sequencer control block 750E enters chain control process 500 and check 501 transfers to progress count check 502. As shown in Table 7, progress count 706E is one. Thus, progress count check 502 transfers processing to enable offshoot operation 504 which in turn transfers to load next block pointer operation 505.

As shown in Table 7, next block pointer 720E of SCSI command block 700E points to SCSI command block 700E. Consequently, operation 505 loads a pointer to SCSI command block 700E in register SCBPTR and transfers processing to progress count check 506.

Since progress count 706E is one, check 506 transfers directly to decrement progress count operation 507. In operation 507, the sequencer decrements progress count 706E from one to zero and transfers to progress count check 508. Since execution of all the SCSI command blocks in chain 707 has completed, progress count 706E is zero. Thus, progress count check 508 transfers to hold-off flag check 510.

Since hold off flag 702E is reset, hold-off flag check 510 transfers to post completion operation 511. Post completion operation 511 posts complete of execution of chain 707 with host adapter driver 205 and chain control process 500 is terminated.

FIGS. 6A to 6C and 7 illustrate another type of SCSI command block. All SCSI command blocks in a chain are either focal or non-focal types, in addition to other possible type classifications. A focal SCSI command block is a chained SCSI command block loaded with a progress count greater than one and less than the maximum, for example block 600D and block 700E.

As explained above, a SCSI command block chain can contain parallel links. Concurrent SCSI command blocks, also as defined above, can be executing in parallel along a given chain path. In addition, there can be multiple chain paths executing in parallel. Ultimately, the commencement of some event in the chain depends on the completion of execution of concurrent SCSI command blocks or multiple execution paths. The event might be the start of execution of another SCSI command block or posting chain completion back to host adapter driver 205. Concurrently executing SCSI command blocks, and parallel paths can complete at different times.

By definition, a focal SCSI command block provides a central log for keeping track of the completion of execution of multiple SCSI command blocks which immediately precede the focal SCSI command block. If a concurrent SCSI command block immediately precedes a focal SCSI command block, every concurrent SCSI command block in that string is considered to also precede the focal SCSI command block.

Each completion is logged by decrementing the progress count in the focal SCSI command block. The last SCSI command block to complete in the group of immediately preceding SCSI command blocks decrements the focal SCSI command block progress count to zero, flagging completion of the entire group.

A non-focal SCSI command block is a chained SCSI command block initially loaded with a progress count of one or the maximum, for example blocks 700A to 700D. A non-focal SCSI command block can be thought of as also providing a central log for SCSI command block completions, but only for a single SCSI command block, not a group of SCSI command blocks. Non-focal and focal SCSI command block types are mutually exclusive.

FIG. 6A shows focal SCSI command block 600D as one of a string of three concurrent SCSI command blocks 600B to 600D. SCSI command block 600D defines the end of the chain. The last SCSI command block in a string of skipped SCSI command blocks is always followed by a focal SCSI command block. A skipped SCSI command block cannot also be a focal SCSI command block.

An offshoot SCSI command block is no different from other SCSI command blocks, except in the manner by which execution of an offshoot SCSI command block is enabled. FIG. 8 expands the example of FIG. 7 to show an offshoot SCSI command block 800F and an additional focal SCSI command block 800G in which the two different execution paths of chain 807 terminate.

SCSI command blocks 800A to 800E are identical to SCSI command blocks 700A to 700E with the following exceptions: offshoot block pointer 830B in SCSI command block 800B points to SCSI command block 800F in place of SCSI command block 800B; and next block pointer 820E points to SCSI command block 800G in place of SCSI command block 800E.

Offshoot block pointer 830B in SCSI command block 800B provides a mechanism for splitting off an additional execution path from an existing chain path. At the completion of SCSI command block 800B, the sequencer accesses offshoot SCSI command block 880F in enable offshoot SCB operation 504 and resets hold-off flag 802F to enable execution of SCSI command block 800F. The enablement of SCSI command block 800F is unconditional, and does not depend on any progress count. All chain paths of chain 807 must merge in SCSI command block 800G before chain execution can be completed.

SCSI command blocks 800C to 800E do not spawn offshoot SCSI command blocks. Offshoot block pointers 830C to 830E are directed back to SCSI command blocks 800C to 800E, respectively, which specifies a 'nop' spawn. As described above with respect to chain control process 500, when any one of SCSI command blocks 800C to 800E complete execution, the sequencer accesses the SCSI command block specified by the offshoot block pointer and resets the hold-off flag in that block. However, the hold-off flag is already reset, so nothing happens. The complete operation of chain control process 500 for execution of blocks 800A to 800G is not repeated, because, in view of the above description, those skilled in the art can step through chain control process 500 for each of the various blocks.

A killer SCSI command block is a SCSI command block with the abort flag set in its chain control byte. At some specified point during execution of a killer SCSI command block, sequencer 290 sets the aborted flag in the SCSI command block pointed to by the offshoot block pointer in the killer SCSI command block. Consequently, the SCSI command block pointed to by the offshoot block pointer is aborted. Herein, when a SCSI command block is aborted, the information in the sequencer control block is not executed. However, chain control chain control process 500 is executed for each SCSI command block that is aborted. Killer SCSI command blocks typically are executed in concurrent pairs of SCSI command blocks.

An application of a pair of killer SCSI command blocks is a RAID 1 read command, where two SCSI Read commands are sent to targets concurrently. The first SCSI command block to see a SCSI Data phase attempts to abort the redundant SCSI command block by setting its aborted flag. This sequence is discussed in more detail below.

Figure 9:
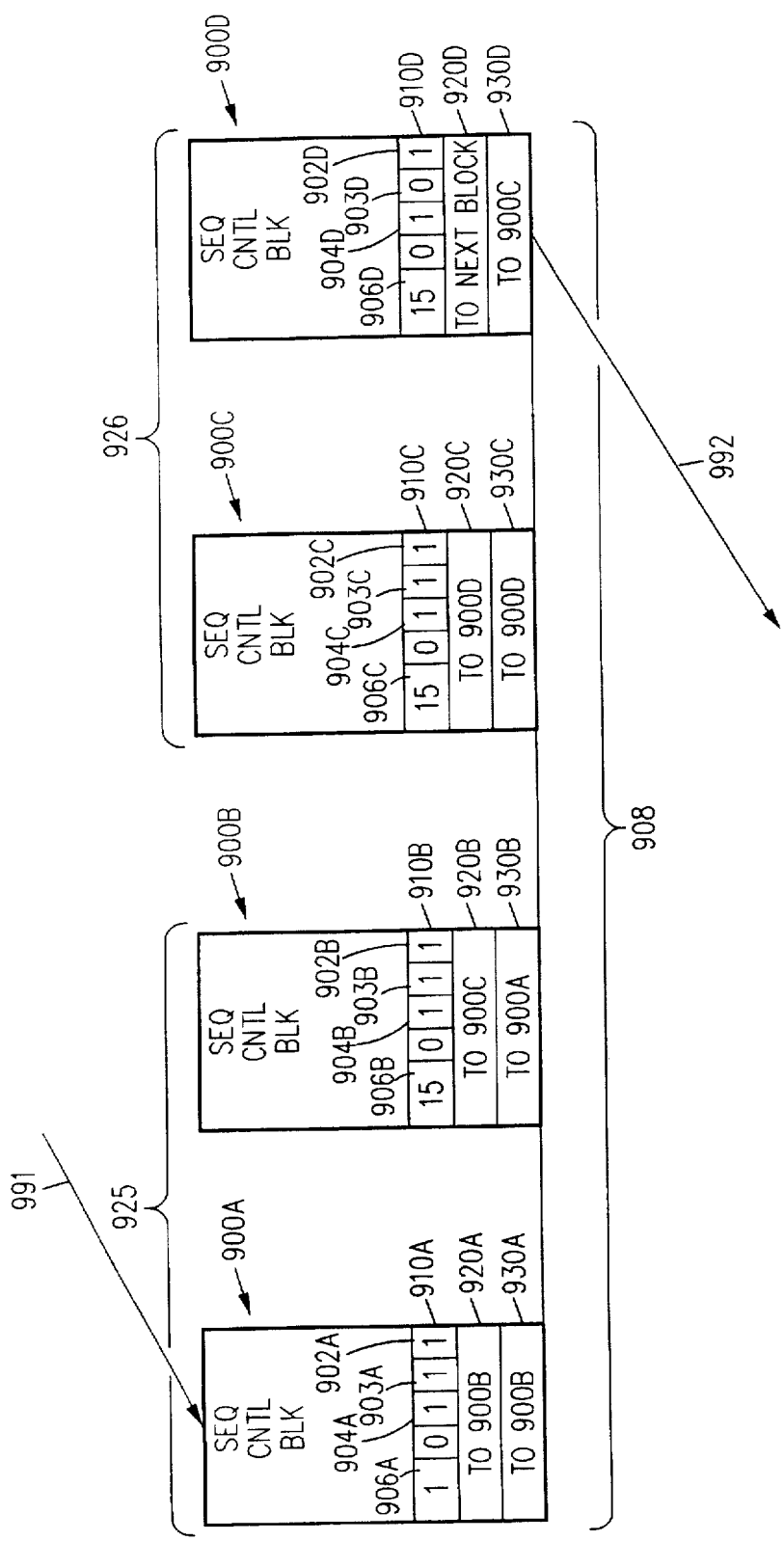
FIG. 9 illustrates two pairs of concurrent killer SCSI command blocks according to the principles of this invention.

FIG. 9 illustrates two pairs of concurrent killer SCSI command blocks 925 and 926. Since SCSI command blocks 900A to 900D are a string of concurrent SCSI command blocks 908, concurrent flags 903A to 903C are set and concurrent flag 903D is reset. Also, progress counts 906B to 906D in blocks 900B to 900D, respectively, are set to the maximum. Thus, blocks 900B to 900D are skipped SCSI command blocks. SCSI command blocks 900A to 900D are non-focal SCSI command blocks. The SCSI command block pointed to by next block pointer 920D is a focal SCSI command block. These attributes of concurrent SCSI command blocks 900A to 900D are the same as described above for other types of SCSI command blocks. Offshoot block pointer 930A in SCSI command block 900A points to SCSI command block 900B. Offshoot block pointer 930B in SCSI command block 900B points back to SCSI command block 900A. When the SCSI command block having a next block pointer to SCSI command block 900A completes execution, chain control process 500, as previously described enables SCSI command blocks 900A to 900D via path 991.

Since abort flags 904A and 904B are set, SCSI command blocks 900A and 900B attempt to abort each other during execution. Similarly, since abort flags 904C and 904D are set, SCSI command blocks 900C and 900D attempt to abort each other during execution. Typically, one SCSI command block in each pair 925 and 926 survives. When both survivors of each SCSI command block pair have completed, execution passes down the chain via path 992 to the focal block pointed to by next block pointer 920D.

Since the offshoot block pointer in a killer SCSI command block is used to identify a SCSI command block to be aborted, the offshoot block pointer cannot be used for spawning offshoot SCSI command blocks. Upon completion of execution of a sequencer control block in a killer SCSI command block, the sequencer in chain control process 500 still uses the offshoot block pointer to spawn an offshoot SCSI command block, but since the offshoot block pointer points to another killer SCSI command block with the hold-off flag already reset, nothing happens.

In the previous description, it was assumed that each SCSI command block 300 in a chain executed successfully to completion. However, errors must be anticipated for chaining to work successfully.

In the event that an error condition is encountered during SCSI command block execution, host adapter driver 205 is interrupted and an error is reported back for that SCSI command block. The chain is broken at that point, and host adapter driver 205 will not receive an interrupt for chain completion.

If only one SCSI command block in the chain encounters an error, host adapter driver 205 sees only one interrupt for the entire chain. If additional SCSI command blocks encounter errors, host adapter driver 205 is interrupted for each SCSI command block with an error.

SCSI command blocks on the chain path following the SCSI command block with an error cannot start execution, because chain control process 500 is not executed for the SCSI block with an error to enable the next SCSI command block in the chain. However, host adapter driver 205 recognizes the SCSI command block with an error as a link in a chain. If there are no parallel links in the chain which could be executing concurrently, chain execution has automatically terminated. If there are SCSI command blocks linked in parallel with the failing SCSI command block, those SCSI command blocks may be continuing to execute. Upon receipt of an error, host adapter driver 205 has the option of letting those SCSI command blocks execute to completion or aborting them.

Host adapter driver 205 is at a disadvantage because host adapter driver 205 does not always know the current state of chain execution. Recall that one of the advantages of this invention is that the invention offloads work from driver 205 to the host adapters. Execution of some SCSI command blocks may not have started, but may be enabled to start. Execution of some SCSI command blocks may be continuing. Execution of other SCSI command blocks may never start. As indicated above, host adapter driver 205 may receive no more interrupts from the chain, so there are no event markers to help host adapter driver 205.

If host adapter driver 205 simply ignores the chain after receiving an error status, host adapter driver 205 runs the risk of issuing another SCSI command block to a target which has started but not yet completed a previous SCSI command block, and receiving a busy status from that target. If host adapter driver 205 is diligent about waiting for completion of SCSI command blocks which have started, host adapter driver 205 could insert traps into the chain which provide host adapter driver 205 with interrupts when those SCSI command blocks have completed. Identifying all of the points to trap could be nasty. Also, host adapter driver 205 might have to wait for a variable number of interrupts. While such an approach would still be advantageous, the approach introduces a level of complexity.

Figure 10:
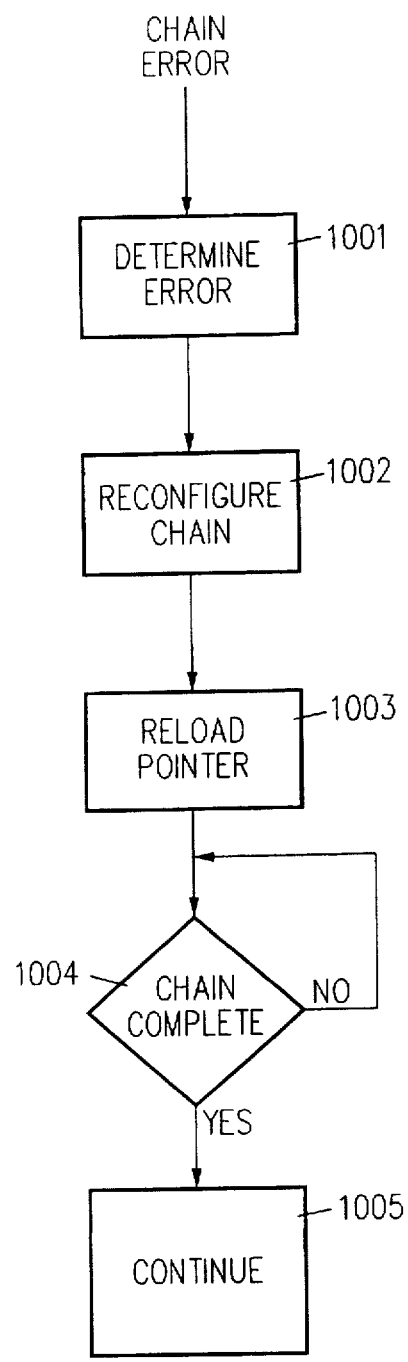
FIG. 10 is a process flow diagram of a process that provides a clean abortion of a chain in the event of an error, and a single interrupt back to the host adapter driver when chain execution has been completely terminated.

Another process 1000 (FIG. 10) provides a clean abortion of a chain in the event of an error, and a single interrupt back to host adapter driver 205 when chain execution has been completely terminated.

Upon receiving an error report from a sequencer, host adapter driver 205 enters an interrupt service routine of which process 1000 is a part. Herein, only the operations for an error generated by execution of a SCSI command block in a chain are described. The other steps are equivalent to those normally used by a driver of a SCSI host adapter.

In determine error source operation 1001, host adapter driver 205 identifies the failing SCSI command block as a link in a chain. As indicated above, the chain may have terminated, or may still be executing. Upon completing operation 1001, host adapter driver 205 transfers processing to reconfigure chain operation 1002.

In reconfigure chain operation 1002, host adapter driver 205 accesses all SCSI command blocks of the chain in SCSI command block array 472 and sets aborted flag 305 in chain control byte 310 of each SCSI command block in the chain. Upon completion of reconfigure chain operation 1002, processing transfers to reload pointer operation 1003.

In reload pointer operation 1003, host adapter driver 205 loads the pointer to the failing SCSI command block back into the queue-in FIFO of the host adapter that executes that command block. However, in general, the pointer to the failing SCSI command block can be loaded in the queue-in FIFO of any host adapter and process 1000 completes successfully.

Since the failed SCSI command block was executing, the hold-off flag is reset. Thus, when the sequencer pops the pointer to the failed SCSI command block off the queue-in FIFO, the failed SCSI command block is enabled and has the aborted flag set. The failing SCSI command block is started a second time, but the sequencer aborts the command block, and enters chain control process 500. Thus, chain execution advances, but each subsequent SCSI command block in the chain on the execution path downstream from the failed SCSI command block is also aborted at the start of execution since the aborted flag is now set.

Process 1000 does not affect execution of SCSI command blocks which already completed without error. SCSI command blocks already executing may or may not be aborted. Either way, the executing SCSI command blocks complete and allow chain execution to proceed.

Upon completing operation 1003, host adapter driver 205 waits for another interrupt that indicates chain completion in chain complete interrupt check 1004.

Ultimately, chain execution completes in chain control process 500 and the completion operation, that was described above, sends an interrupt to host adapter driver 205. Upon determining that execution of the chain has completed, host adapter driver 205 transitions to continue operation 1005 in which host adapter driver 205 goes on with the normal error handling completion.

At this point, host adapter driver 205 knows the original chain execution failed, knows which SCSI command block failed, and knows that all chain execution has terminated. Also, the chain has completed execution following the failure without initiating any new data transfers or commands to SCSI targets.

Some example chains are described below for RAID 0, 1, and 5 operations. For each example, a flow diagram illustrates the flow of SCSI command block execution through the chain. However, rather than provide the configuration of chain control block 360 in each Figure, a table describes the initialization of the chain control block that is used in chain control process 500 by the sequencer. In the tables that follow, bits in chain control byte 310 that are not shown are reset. Also, the entry in the pointer columns is the SCSI command block reference numeral to which the pointer points. Also in this embodiment, host adapter driver 205 is responsible for linking SCSI command blocks together into a chain, as specified by a RAID manager.

A RAID 0 operation sequence is the simplest of all of the RAID operation sequences. A block of data is divided into a plurality of stripes and each stripe is written to or read from a different SCSI target device. Host adapter driver 205 builds a SCSI command block 1100A to 1000C for each of a plurality of SCSI targets and the SCSI command blocks are issued simultaneously to each of hosts adapters 260A to 260C.

Figure 11:
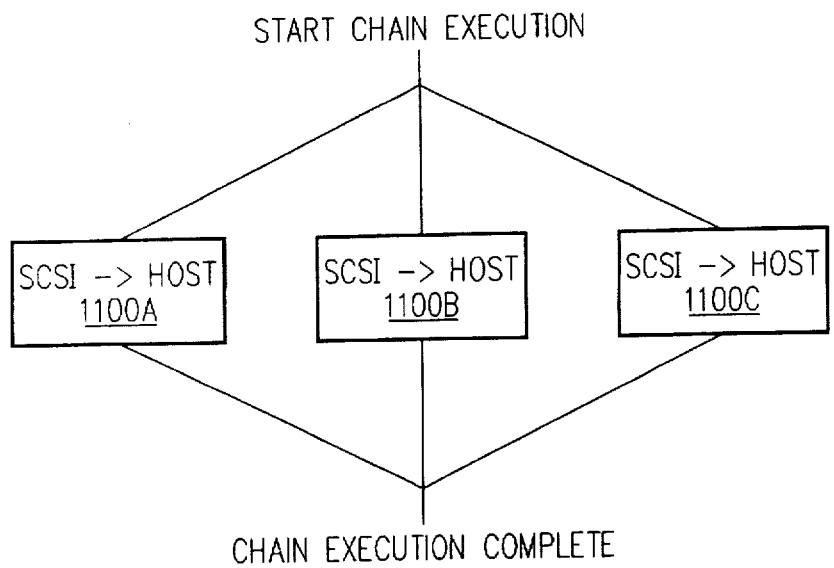
FIG. 11 is an execution flow diagram of a chain of this invention that implements the RAID 0 read operation.

FIG. 11 is an execution flow diagram of chain 1107 that implements the RAID 0 read operation. SCSI command blocks 1100A to 1100C show that the direction of data flow for a RAID 0 read operation, i.e., from SCSI targets to the host, but the diagram and the chain control blocks are the same for a RAID 0 write operation with the data flow direction reversed.

TABLE 8

STATE OF CHAIN CONTROL BLOCK
FOR INITIATION OF
A RAID 0 READ OR WRITE SEQUENCE

| SCSI CMD BLK | Progress Count | Concurrent Flag | Hold-off Flag | Next Blk Ptr | Offsht Blk Ptr |
|---|---|---|---|---|---|
| 1100A | TO 1 | 0 | 0 | 1100C | 1100A |
| 1100B | 1 | 0 | 0 | 1100C | 1100B |
| 1100C | 3 | 0 | 0 | 1100C | 1100C |

SCSI command blocks 1100A to 1100C are all at the head of chain 1107, and are enabled to execute concurrently by host adapter driver 205 because hold-off flags 1102A to 1102C are all reset. Since host adapter driver 205 has enabled blocks 1100A to 1100C to execute concurrently, host adapter driver 205 does not set the concurrent flags.

Since SCSI command blocks 1100A to 1100C are all at the head of chain 1107, all the next block pointers point to the last SCSI command block 1100C in chain 1107. The progress count in last SCSI command block 1100C is the sum of the total number of concurrent SCSI command blocks immediately preceding block 1100C plus one. Since blocks 1100A and 1100B are at the head of chain 1107, the progress count is set to one.

When each SCSI command block completes, the sequencer in process 500 decrements the progress count in SCSI command block 1100C. When all of SCSI command blocks 1100A to 1100C complete execution, host adapter driver 205 is notified as described above for execution of a string of concurrent SCSI command blocks.

The simplest RAID 1 read operation is performed by issuing a SCSI read command to one target. If an error is detected during the SCSI read command, a second SCSI read command is issued to the redundant target Average disk latency time can be reduced by about 30% if a slightly more complex command sequence is used. In this case, RAID host adapter driver 205 issues SCSI commands to both target drives concurrently, and aborts the command to the target with the longer latency. Although, the following operations minimize total command execution time for RAID 1 operations, these operations can be applied in general to any two chain links, where one link at a prescribed point in its execution is to attempt to abort the other link.

Figure 12:
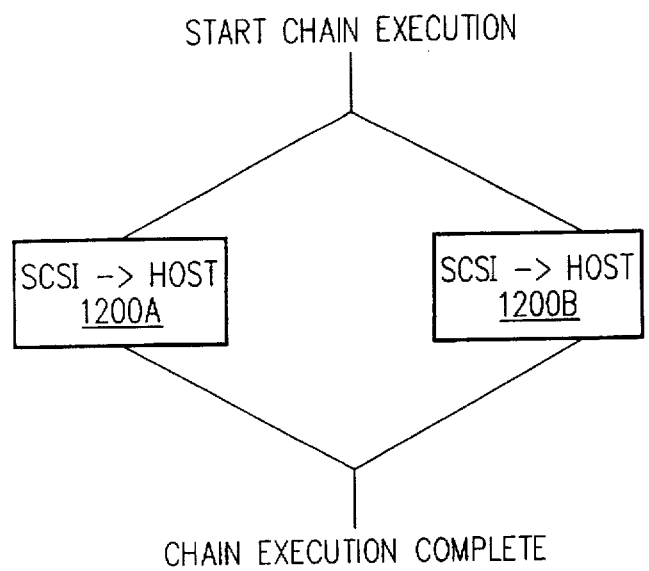
FIG. 12 is an execution flow diagram of chain of this invention that implements a RAID 1 read operation.

FIG. 12 is an execution flow diagram of chain 1207 that implements a RAID 1 read operation. RAID 1 host adapter driver 205 loads two SCSI command blocks 1200A and 1200B, that each include a SCSI read command, into a SCSI command block array. In this example, SCSI command blocks 1200A and 1200B are at the head of chain 1207 and so command block pointers are loaded into the queue-in FIFO together, so that the SCSI command blocks execute concurrently.

Alternatively, SCSI command blocks 1200A and 1200B could be enabled by a previous link in a chain and configured as a string of concurrent SCSI command blocks. As explained more completely below, the execution of the first SCSI command block to start data transfer is allowed to run through to completion. An attempt is made to abort execution of the other SCSI command block. If execution of the other SCSI command block is not aborted, the execution runs to completion. No target is abandoned. Chain control process 500 must recognize that both SCSI command blocks 1200A and 1200B have terminated before chain execution can advance. Host adapter driver 205 is not interrupted until both SCSI command blocks 1200A and 1200B have terminated, so that host adapter driver 205 knows both targets are available for other commands.

The pair of SCSI command blocks presented in Table 9 is comprised of two killer SCSI command blocks 1200A and 1200B.

TABLE 9

STATE OF CHAIN CONTROL BLOCK
FOR INITIATION OF
A RAID 1 READ SEQUENCE

| SCSI CMD BLK | Progress Count | Abort Flag | Hold-off Flag | Next Blk Ptr | Offsht Blk Ptr |
|---|---|---|---|---|---|
| 1200A | 1 | 1 | 0 | 1200B | 1200B |
| 1200B | 2 | 1 | 0 | 1200B | 1200A |

In this example, SCSI command blocks 1200A and 1200B are at the head of chain 1207, and are enabled to execute concurrently by host adapter driver 205 because hold-off flags 1202A and to 1202B are reset. Since host adapter driver 205 has enabled blocks 1200A and 1200B to execute concurrently, host adapter driver 205 does not set the concurrent flags. If blocks 1200A and 1200B were at other than the head of the chain, the concurrent flags would be set in a normal manner for a string of concurrent SCSI command blocks.

The abort flags in both blocks 1200A and 1200B are set to indicates that at the commencement of data transfer, the current SCSI command block is to abort the other SCSI command block. When the "aborted" flag is set, the current SCSI command block has been aborted, and a reasonable attempt is made to cleanly terminate execution. When the "aborted" flag is reset, SCSI command block execution can proceed normally.

The progress count in last SCSI command block 1200B is the sum of the total number of concurrent SCSI command blocks immediately preceding block 1200B plus one. Block 1200A is at the head of chain 1207 and so the progress count is set to one.

Since SCSI command blocks 1200A and 1200B are all at the head of chain 1207, all the next block pointers point to the last SCSI command block 1200B in chain 1207. If blocks 1200A and 1200B were at other than the head of the chain, the next block pointers would be initialized in the normal manner described above.

The offshoot block pointer in each SCSI command block 1200A and 1220B points to the other SCSI command block in the pair. The offshoot block pointers give each SCSI command block the location of the other SCSI command block to be aborted.

Figure 13A:
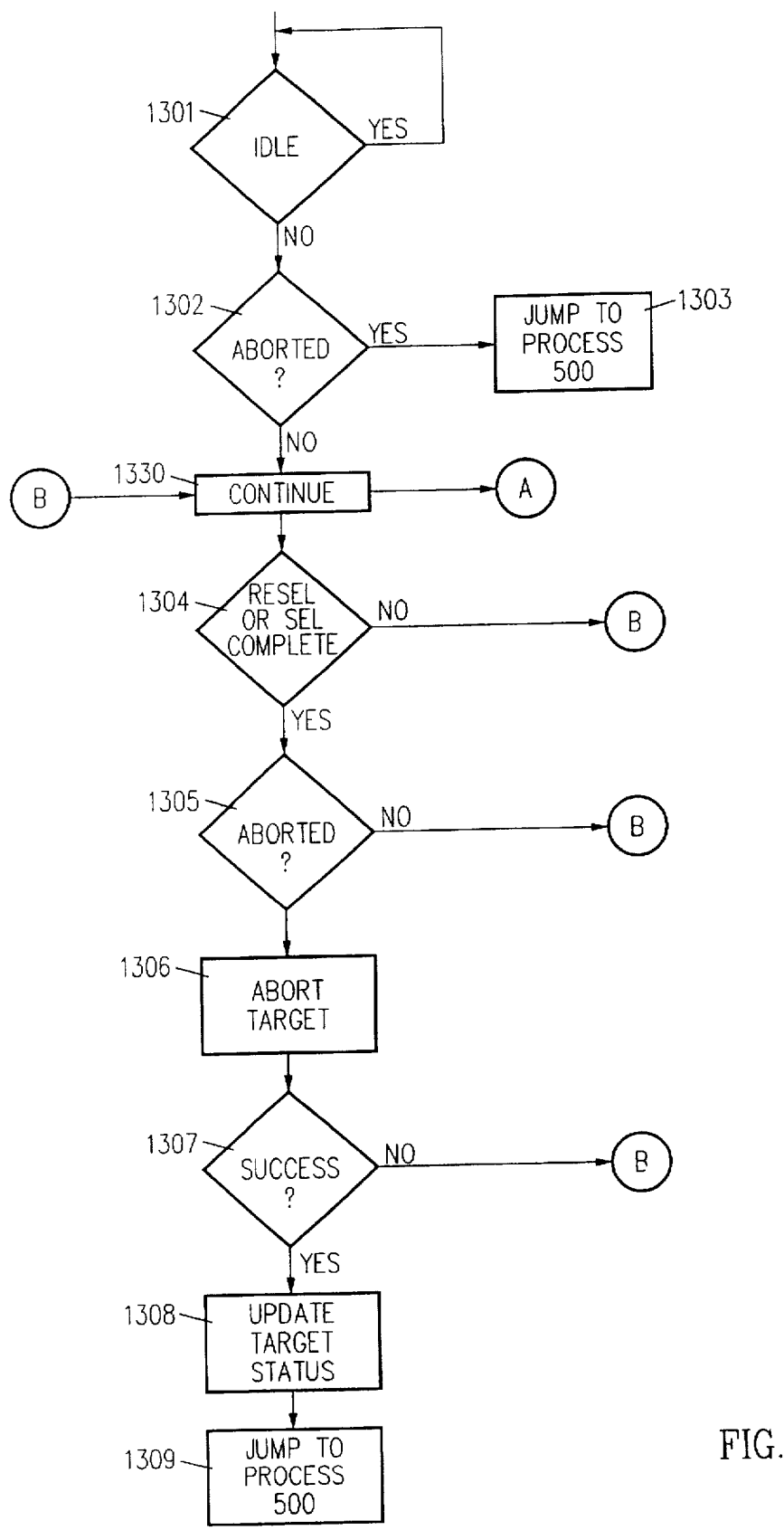
FIGS. 13A and 13B are a process flow diagram for one embodiment of the checks made to detect action of a killer SCSI command block and to implement the actions of a killer SCSI command block.

SCSI command blocks 1200A and 1220B are started simultaneously by host adapter driver 205 and so blocks 1200A and 1200B execute concurrently. The sequencer or sequencers executing blocks 1200A and 1200B make various checks for aborting a SCSI command block during the execution. Process 1300 (FIGS. 13A and 13B) is one embodiment of the checks made to detect action of a killer SCSI command block and to implement the actions of a killer SCSI command block.

Process 1300 shows only the specific checks and operations associated with implementing killer SCSI command blocks that abort another SCSI command block. Typically, these checks and operations are implemented within the sequencer firmware at appropriate locations for performance of the various SCSI phases. Thus, process 1300 is illustrative only of one embodiment for implementing killer SCSI command blocks, and does not include the normal checks and operations used to execute a SCSI command block, since these checks and operations are known to those of skill in the art.

As explained above, a sequencer enters an idle loop and checks to determine whether a SCSI command block is available for execution. If a SCSI command block is available, the sequencer loads the SCSI command block pointer and initiates execution. At this point, idle check 1301 (FIG. 13A) is false and so processing transfers to aborted check 1302.

Thus, at the start of the execution a SCSI command block in aborted check 1302, the sequencer checks the aborted flag in the chain control byte to determine whether the aborted flag is set. If the aborted flag is set, the sequencer branches to operation 1303 which jumps to chain control process 500 and initiates chain control process 500 as if the sequencer control block in the SCSI command block has completed normally. If the aborted flag is reset at the start of execution, the sequencer continues execution in continue execution operations 1330.

Upon completion of a SCSI phase, the sequencer transfers from continue execution operations 1330 to reselection or selection complete check 1304. If the completed SCSI phase was completion of a reselection or selection, check 1304 transfers to aborted check 1305, and otherwise continues execution of the SCSI command block in continue execution operations 1330. In check 1305, the sequencer accesses the aborted flag in the chain control byte to determine whether the aborted flag is set. If the aborted flag is set, the sequencer transfers from check 1305 to abort target operation 1306, and otherwise returns to continue execution operations 1330.

In abort target operation 1306, the sequencer attempts to abort the target by asserting attention following reselection, and checks the next SCSI phase for message out. If message out is received, the sequencer sends the abort message to the target and terminates the SCSI command block. If the next SCSI phase is not message out, the abortion attempt is considered to have failed. Abort target operation 1306 transfers to success check 1307.

If the target is successfully aborted, check 1307 transfers to update target status operation 1309 in which the sequencer clears the waiting and disconnected status for that target to prevent blocking the start of new commands to the aborted target. After the waiting and disconnected status are cleared in operation 1309, the sequencer initiates chain control process 500 as if the SCSI command block has completed normally by jumping to chain control process 500 in operation 1309. If the target is not successfully aborted, the sequencer continues execution of the SCSI command block in operations 1330.

Figure 13B:
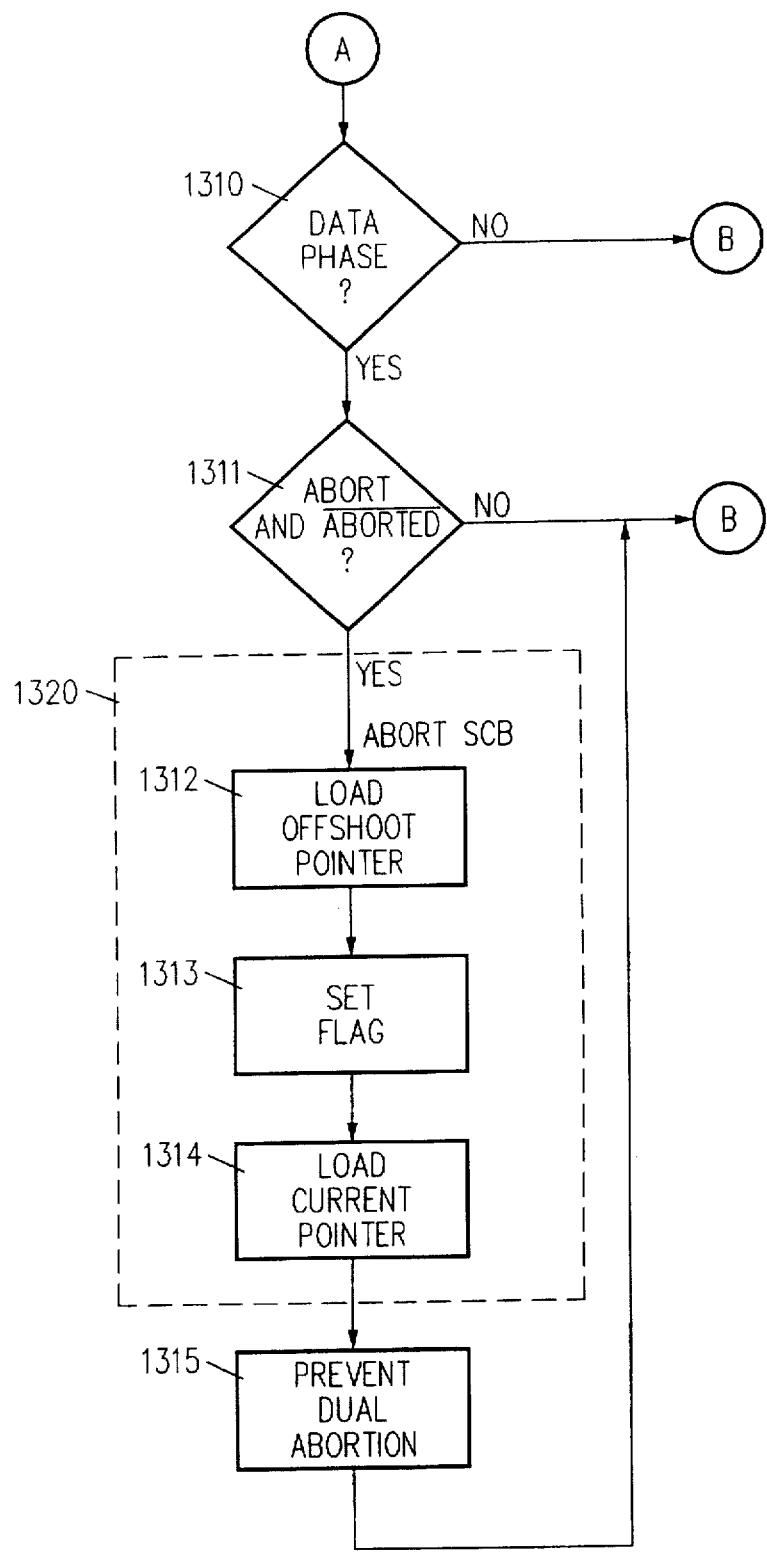

At the start of a SCSI phase, the sequencer transfers from continue execution operations 1330 to data phase check 1310 (FIG. 13B). If data phase check 1310 is true, processing transfers to abort and not aborted check 1311, and otherwise returns to operations 1330. In abort and not aborted check 1311, the sequencer checks the chain control byte to determine whether the aborted flag is reset, and the abort flag is set. If the aborted flag is reset and the abort flag is set, check 1311 transfers to abort SCB operation 1320 and otherwise to continue execution operations 1330.

In abort SCB operation 1320, the sequencer loads the offshoot block pointer into SCB pointer register SCBPTR in load offshoot block pointer operation 1312 and then transfers to set flag operation 1313. In set flag operation 1313, the sequencer sets the aborted flag in the SCSI command block identified by the offshoot block pointer in register SCBPTR.

After setting the aborted flag in an attempt to kill the other SCSI command block, the sequencer transfers to load current pointer operation 1314 and restores current SCSI command block pointer to SCB pointer register SCBPTR. This completes abort SCB operation 1320 and the sequencer transfers to prevent dual abortion operation 1315.

In operation 1315, the sequencer resets the abort flag in the current SCSI command block. This prevents execution of this path again. Next, the sequencer resets the aborted flag in the current SCSI command block in case the aborted flag had been set by the sequencer executing the other SCB in the pair. This prevents the two SCSI command blocks from aborting each other. After these operations, the sequencer continues with execution of the SCSI command block in continue execution operations 1330.

If the aborted flag is not reset and the abort flag set, the other SCSI command block has either set the aborted flag, or the current SCSI command block is not a part of a pair of killer SCSI command blocks. In either case, execution of the SCSI command block continues in continue operations 1330.

In any combination, chain control process 500 is executed for both SCSI command blocks 1200A and 1200B and so chain control process 500 posts completion in a normal manner as described above. Thus, host adapter driver 205 is not interrupted until both SCSI command blocks have terminated, and host adapter driver 205 is always interrupted only once for the SCSI command block pair.

This abortion process 1300 accommodates the general case of two SCSI command blocks executed by two different sequencers. This case is more complex than the case of two SCSI command blocks executed by the same sequencer, because the state of the SCSI command block to be aborted is not known at the time the decision is made to abort it. The SCSI command block looks the same whether data is transferring or the pointer to the SCSI command block is still in the queue-in FIFO.

For the single sequencer case, the state of the SCSI command block to be aborted is known. The pointer is still in the queue-in FIFO, its status is either waiting or disconnected, or execution is complete. Otherwise, the surviving SCSI command block would not have the sequencer.

In either case, the aborted SCSI command block cannot be abandoned until the SCSI command has terminated. For example, if a disconnected status were simply cleared for a disconnected target, the surviving SCSI command block could post done to the host before the disconnected target is aborted. The host could load another SCSI command block to the disconnected target, and get a busy status interrupt when execution of the another SCSI command block is attempted.

A rigorous abortion attempt requires that the sequencer look for abortion status at every point during SCSI command block execution. This is obviously costly in terms of sequencer firmware, so some assumptions are made about the relationship of executions of the two SCSI command blocks:

1.) When both SCSI command blocks are executed by the same sequencer, only one SCSI command block can be started first. If the target already has the data cached, the target will not disconnect. Therefore, the surviving SCSI command block can complete before the other SCSI command block can be started. It is desirable to prevent execution of the other SCSI command block and post completion to the host as soon as possible.

2.) When the two SCSI command blocks are executed by different sequencers, the two SCSI command blocks can be started at the same time. If the targets disconnect, the targets are likely to be disconnected for different lengths of time. When one target reconnects, the SCSI command block for the other target is marked for abortion. The other target can be aborted when it reconnects.

3.) If the two SCSI command blocks are started simultaneously and if neither target disconnects, abortion must be attempted during the SCSI data phase. If both targets enter the SCSI data phase at about the same time, the targets probably both complete at about the same time, so abortion is of little value, except to reduce data traffic on the buses. Thus, both SCSI command blocks are allowed to continue executing even if the aborted flag is set for one of the two.

The two interesting points to look for a request for abortion are therefore when the SCSI command block is popped out of the queue-in FIFO and during reselection, as described above.

A RAID 1 write operation involves transferring the same data from the host buffer to two different SCSI targets. The simplest RAID 1 write operation transfers the data directly from host to target, without involving host adapter memory. A disadvantage is that the same data is transferred twice across the host bus.

Data can be transferred only once if the host adapter memory is used. Data is first transferred from the host buffer to host adapter memory. Data is transferred out of the host adapter memory to the targets in two separate operations to the SCSI targets.

Figure 14:
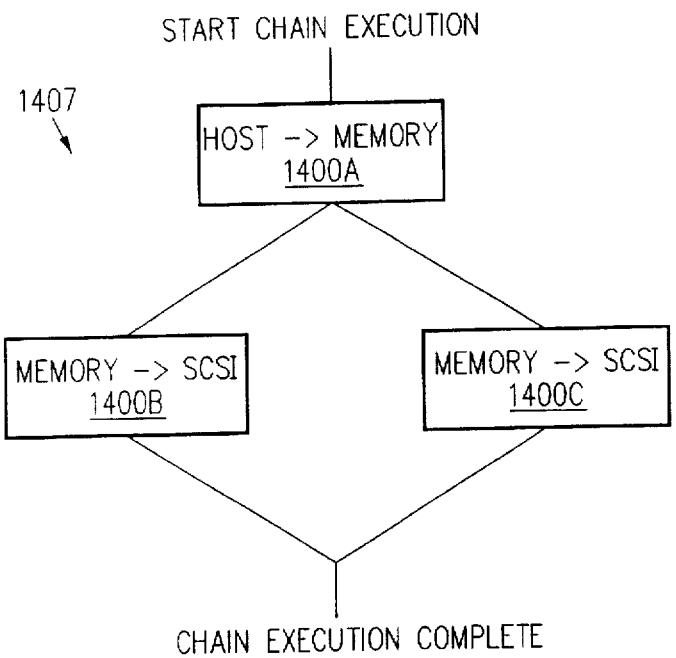
FIG. 14 is an execution flow diagram of a chain of this invention that accomplishes a RAID 1 write operation.

FIG. 14 is a diagram of execution of chain 1407 that accomplishes these operations. Table 10 gives the state of SCSI command blocks 1400A to 1400C when chain 1407 is built by host adapter driver 205 and sent to host adapter 260.

TABLE 10

STATE OF CHAIN CONTROL BLOCK
FOR INITIATION OF
A RAID 1 WRITE SEQUENCE

| SCSI CMD BLK | Progress Count | Concurrent Flag | Hold-off Flag | Next Blk Ptr | Offsht Blk Ptr |
|---|---|---|---|---|---|
| 1400A | 1 | 0 | 0 | 1400B | 1400A |
| 1400B | 1 | 1 | 1 | 1400C | 1400B |
| 1400C | 2 | 0 | 1 | 1400C | 1400C |

SCSI command block 1400A is at the head of chain 1407, and is enabled to execute by host adapter driver 205 because hold-off flag 1402A is reset. SCSI block 1400B and 1400C are a string of concurrent SCSI command blocks and so are configured as previously described.

Execution of SCSI command block 1400A starts as soon as the sequencer pops the pointer to block 1400A out of the queue-in FIFO. When execution of the sequencer control block in SCSI command block 1400A is complete, the sequencer executes chain control process 500 that clears the hold-off flag in SCSI command block 1400B, which in turn enables block 1400B for execution. Since the concurrent flag is set in SCSI command block 1400B, the sequencer also enables execution of SCSI command block 1400C by resetting the hold-off flag.

SCSI command block 1400C is the focal SCSI command block for concurrent SCSI command blocks 1400B and 1400C. The last sequencer to complete SCSI command block execution decrements the progress count in SCSI command block 1400C to zero and posts chain complete back to host adapter driver 205.

Figure 15:
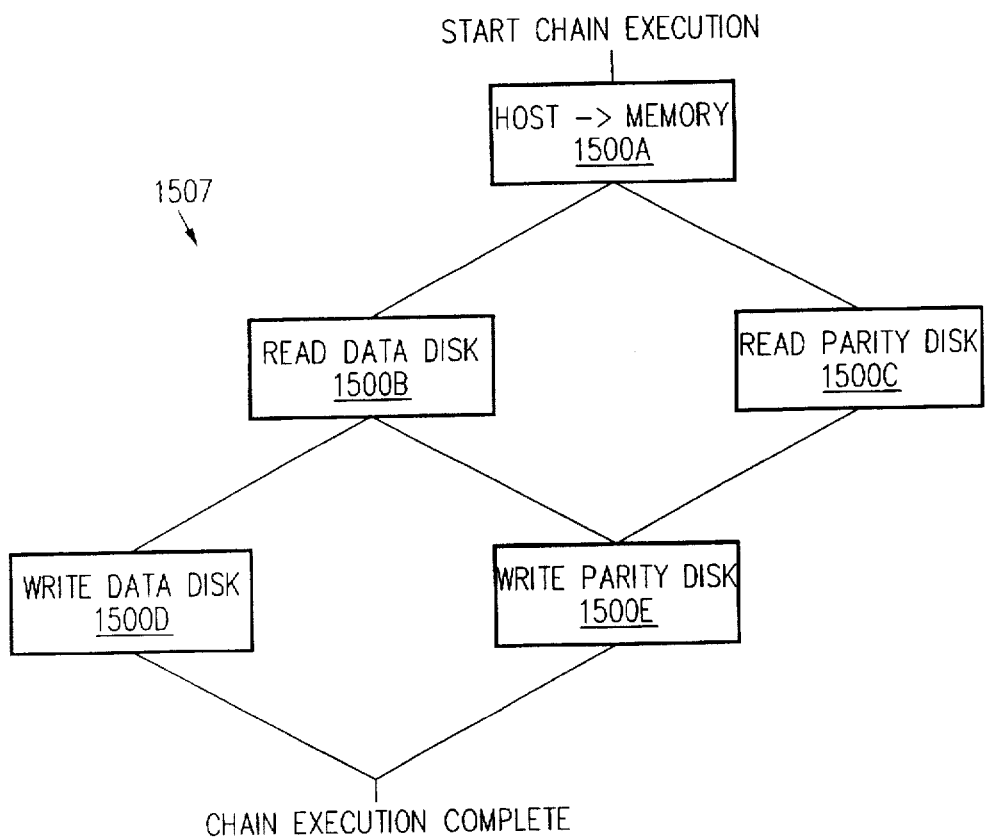
FIG. 15 is an execution flow diagram of a chain of this invention that accomplishes a RAID 5 write operation.

FIG. 15 is a diagram of execution of chain 1507 that accomplishes a RAID 5 write operation. Table 11 gives the state of SCSI command blocks 1500A to 1500E when chain 1507 is built by host adapter driver 205 and loaded in shared memory 255 for host adapters 260A to 260C and PCI buffer controller and XOR function circuit 265. As indicated above, and explained more completely in copending, commonly filed, and commonly assigned U.S. patent application Ser. No. 08/617,993 entitled "AN INTEGRATED PCI BUFFER CONTROLLER AND XOR FUNCTION", of B. Arlen Young, circuit 265 includes a RISC sequencer, and DMA engine similar to those in hosts adapters 260A to 260C. Thus, circuit 265 can execute a SCSI command block. In addition, circuit 265 provides a XOR function between data in buffer memory 245 and data provided to circuit 265. The result of the XOR operation is typically stored in buffer memory 245.

TABLE 11

STATE OF CHAIN CONTROL BLOCK
FOR INITIATION OF
A RAID 5 WRITE SEQUENCE

| SCSI CMD BLK | Progress Count | Concurrent Flag | Hold-off Flag | Next Blk Ptr | Offsht Blk Ptr |
|---|---|---|---|---|---|
| 1500A | 1 | 0 | 0 | 1500B | 1500A |
| 1500B | 1 | 1 | 1 | 1500C | 1500D |
| 1500C | 15 | 0 | 1 | 1500E | 1500C |
| 1500D | 2 | 0 | 1 | 1500D | 1500D |
| 1500E | 2 | 0 | 1 | 1500D | 1500E |

TABLE 12

TYPE OF EACH SCSI COMMAND BLOCK
IN TABLE 11 FOR
A RAID 5 WRITE SEQUENCE

| SCSI CMD BLK | TYPE |
|---|---|
| 1500A | Head of chain |
| 1500B | Concurrent |
| 1500C | Concurrent, skipped |
| 1500D | Offshoot, focal, End of Chain |
| 1500E | Focal |

SCSI command block 1500A is at the head of chain 1507, and is enabled to execute by host adapter driver 205 because hold-off flag 1502A is reset. The hold-off flags in SCSI command blocks 1500B to 1500D are initially set.

SCSI command blocks 1500B and 1500C are a string of concurrent SCSI command blocks and so the chain control bytes and next block pointers are configured as previously described. SCSI command block 1500B has the offshoot block pointer set to point and SCSI command block 1500D, but the abort bit in SCSI command block 1500B is not set. Thus, SCSI command block 1500D is an offshoot SCSI command block, and SCSI command block 1500B is not a killer SCSI command block.

The progress count in SCSI command block 1500A is set to one because block 1500A is the head of the chain. The progress count in SCSI command block 1500B is set to one because SCSI command block 1500A immediately precedes block 1500B and must complete execution before execution of block 1500B can begin. The progress count in SCSI command block 1500C is set to fifteen because SCSI command block 1500C is at the end of a string of concurrent blocks and is not the last block in chain 1507. The progress count in SCSI command block 1500D is set to two because SCSI command block 1500D is at the end of chain 1507 and the total number of SCSI command blocks immediately preceding block 1500D is two, i.e. in blocks other than block 1500D, the total number of pointers to block 1500D is two. The progress count in SCSI command block 1500E is set to two because the total number of concurrent blocks immediately preceding block 1500E is two and there are no non-current blocks immediately preceding block 1500E. Note that in this example the reference numerals do not indicate the relative position of the blocks within chain 1507. The position of any block within a chain is defined by the pointers in the chain control blocks of the SCSI command blocks in the chain.

After host adapter driver 205 builds chain 1507, host adapter driver 205 transfers chain 1507 to memory 255 and places pointers to the appropriate blocks in the chain in the queue-in FIFOs of host adapters 260A to 260C and circuit 265. In this embodiment, a pointer to SCSI command block 1500A is placed in the queue-in FIFO of circuit 265 and SCSI command blocks 1500B to 1500D are placed the appropriate queue-in FIFOs of host adapters 260A to 260C.

As shown in FIG. 15, SCSI command block 1500A includes instructions for a SCSI write transfer from the host computer memory to buffer memory 245. SCSI command block 1500B includes instructions for a SCSI read transfer from a disk to buffer memory 245 and an exclusive OR of the data in buffer memory 245 and the data from the disk. SCSI command block 1500C includes instructions for a SCSI read transfer from a disk to buffer memory 245 and an exclusive OR of the data in buffer memory 245 and the data from the disk. SCSI command block 1500E includes instructions for a SCSI write transfer of the parity data generated as a result of the execution of blocks 1500A to 1500C from buffer memory 245 to a disk. SCSI command block 1500D includes instructions for a SCSI write transfer of the new data to the target disk drive. This SCSI write transfer could be either from buffer memory 245 or the host computer memory.

When the sequencer in circuit 265 initiates execution for SCSI command block 1500A, data is transferred from the host computer buffer memory to buffer memory. This transfer can execute at maximum PCI bus speed. When the data transfer is complete, the sequencer performs chain control process 500, as described above. Chain control process 500 enables execution of SCSI command block 1500B by resetting the hold-off flag. Since the concurrent flag is set in SCSI command block 1500B, execution of SCSI command block 1500C is also enabled.

Thus, execution of SCSI command blocks 1500B and 1550C is initiated. As the data is read in response to the read command and transferred to circuit 265, the XOR function in circuit 265 combines the data in memory 255 with the read data in an Exclusive OR function (XOR) and writes the result of the Exclusive OR function back to memory 255. Thus, when the read transfers in SCSI command blocks 1500B and 1500C are both complete, the new parity data for the new data is stored in memory 255.

When the SCSI read operation specified in SCSI command block 1500B is complete, the sequencer executing block 1550B initiates chain control chain control process 500. Here it is assumed that execution of block 1500B completes before block 1500C, but the result is the same independent of the order of execution of blocks 1500B and 1500C. In enable offshoot SCB operation 1504, the hold-off flag in SCSI command block 1500D, that is addressed by the offshoot block pointer in block 1500B (See Table 13), is reset and so SCSI command block 1500D is enabled unconditionally for execution. In the execution of chain control chain control process 500, SCSI command block 1500C is skipped, and the progress count in SCSI command block 1500E is decremented.

When the SCSI read operation specified in sequencer control block 1550C is complete, the sequencer executing block 1500C initiates chain control process 500. Chain control process 500 decrements the progress count in SCSI command block 1500E to zero and so SCSI command block 1500E is enabled for execution.

When SCSI command block 1500E is executed, the new parity data is written from memory 245 to the appropriate target disk drive. Upon completion of the SCSI write command in block 1500E, the sequencer executing the command initiates chain control process 500, which decrements the progress count in SCSI command block 1500D.

If the write command in SCSI command block 1500D has already completed, and the process count decremented, the decrement of the progress count of block 1500D, after completion of execution of the sequencer control block in block 1500E, reduces the count to zero. Since the hold-off flag in block 1500D is reset and the progress count is zero, the execution of chain 1507 is complete and notice of the completion is posted back to host adapter driver 205.

If the write command in SCSI command block 1500D has not already completed, the decrement of the progress count of block 1500D, after completion of execution of the sequencer control block in block 1500E, reduces the progress count to one. Thus, in this case when execution of SCSI command block 1500D is complete, the progress count is decremented to zero and chain completion is posted to host adapter driver 205.

Normally, a RAID 5 read operation is done through execution of a single SCSI read command to the data target. In the event that a normal RAID 5 read fails, the redundancy in the stripe across all RAID 5 targets must be used to recover the data lost on the failing target. The data from all drives is XORed together, and the result is recovered data, which is transferred to the host buffer.

Figure 16:
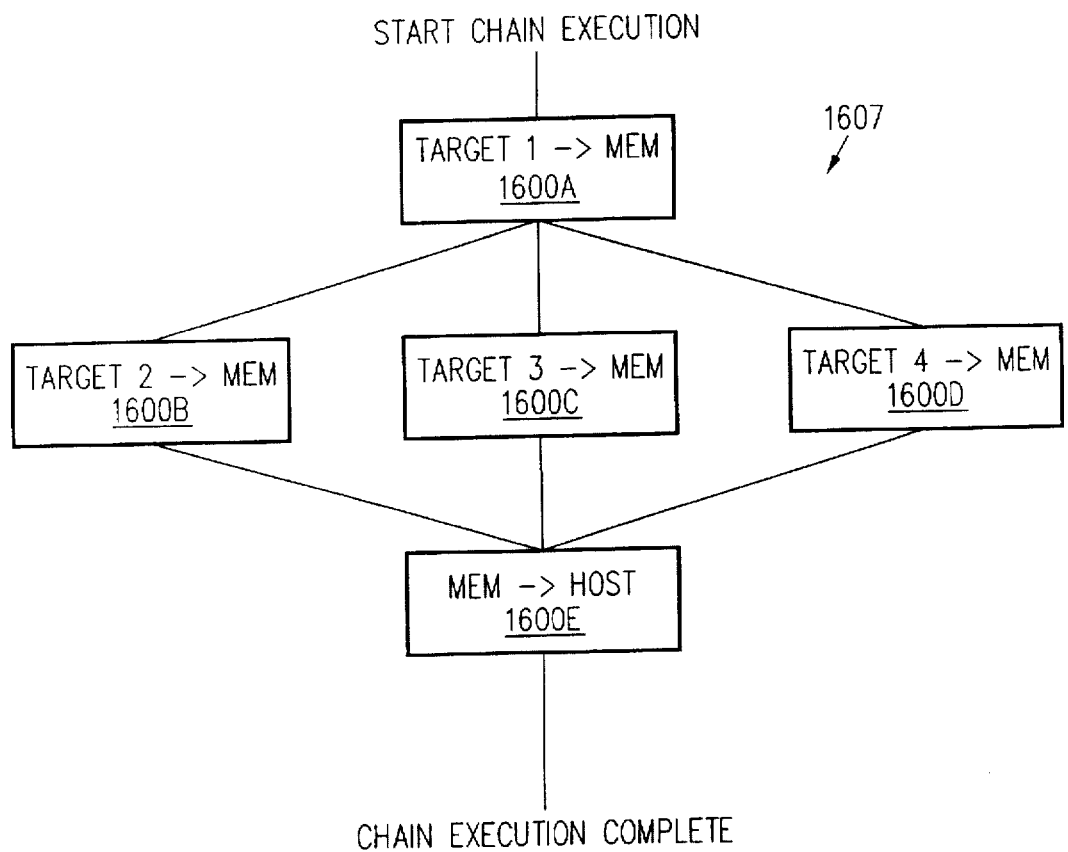
FIG. 16 is an execution flow diagram of a chain of this invention that accomplishes a RAID 5 read operation with a bad data target.

Again, the sequence of SCSI command block execution for such an operation is a chain of SCSI command blocks 1607. In this example, the RAID array has five targets, one of which has been identified as bad. FIG. 16 is a diagram of execution of chain 1607 that accomplishes a RAID 5 read operation with a bad data target. Table 13 gives the state of SCSI command blocks 1600A to 1600E when chain 1607 is built by host adapter driver 205 and loaded in shared memory 255 for host adapters 260A to 260C and PCI buffer controller and XOR function circuit 265.

TABLE 13

STATE OF CHAIN CONTROL BLOCK
FOR INITIATION OF
A RAID 5 WRITE SEQUENCE
WITH A BAD TARGET

| SCSI CMD BLK | Progress Count | Concurrent Flag | Hold-off Flag | Next Blk Ptr | Offsht Blk Ptr |
|---|---|---|---|---|---|
| 1600A | 1 | 0 | 0 | 1600B | 1600A |
| 1600B | 1 | 1 | 1 | 1600C | 1600B |
| 1600C | 15 | 1 | 1 | 1600D | 1600C |
| 1600D | 15 | 0 | 1 | 1600E | 1600D |
| 1600E | 3 | 0 | 1 | 1600E | 1600E |

TABLE 14

TYPE OF EACH SCSI COMMAND BLOCK
IN TABLE 13 FOR
A RAID 5 READ SEQUENCE
WITH A BAD TARGET

| SCSI CMD BLK | TYPE |
|---|---|
| 1600A | Head of chain |
| 1600B | Concurrent |
| 1600C | Concurrent, skipped |
| 1600D | Concurrent, skipped |
| 1600E | Focal, end of chain |

Figure 7:
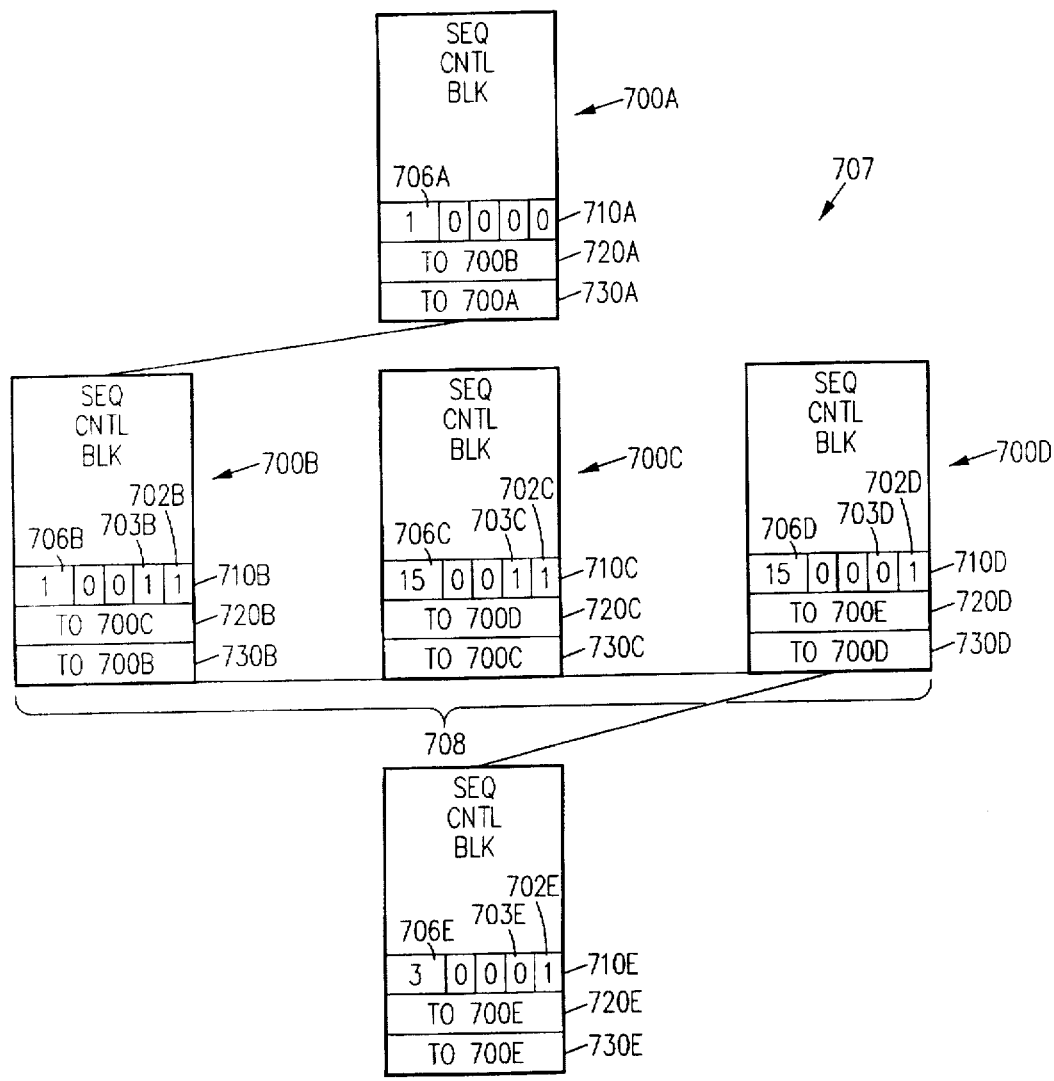
FIG. 7 is another example of a chain, according to the principles of this invention that includes three concurrent SCSI command blocks in a string.
Figure 8:
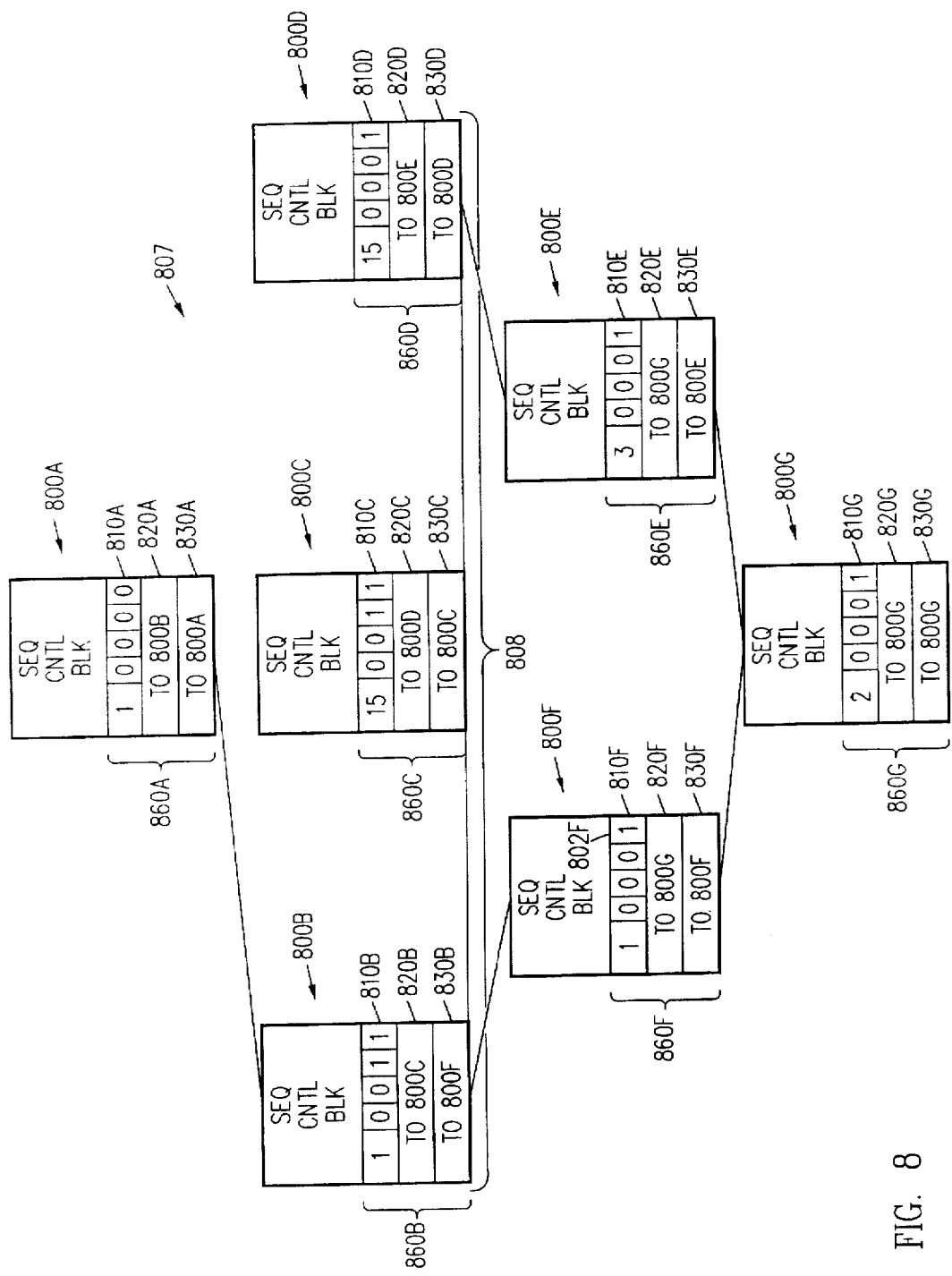
FIG. 8 expands the example of FIG. 7 to show an offshoot SCSI command block and an additional focal SCSI command block in which the two different execution paths of the chain terminate.

The chain control blocks for SCSI command blocks 1600A to 1600E are the same as the chains control blocks for SCSI command blocks 700A to 700E and so the description of FIG. 7 is incorporated herein by reference and is not repeated.

After host adapter driver 205 builds chain 1607, host adapter driver 205 transfers chain 1607 to memory 255 and places pointers to the appropriate blocks in chain 1607 in the queue-in FIFOs of host adapters 260A to 260C and circuit 265. In this embodiment, a pointer to SCSI command block 1600E is placed in the queue-in FIFO of circuit 265 and SCSI command blocks 1600A to 1600D are placed the appropriate queue-in FIFOs of host adapters 260A to 260C.

As shown in FIG. 16, SCSI command block 1600A includes instructions for a SCSI read transfer from a SCSI target to buffer memory 245. SCSI command block 1600B includes instructions for a SCSI read transfer from a disk to buffer memory 245 and an exclusive OR of the data in buffer memory 245 and the data from the disk. Similarly, SCSI command blocks 1600C and 1600D each include instructions for a SCSI read transfer from a disk to buffer memory 245 and an exclusive OR of the data in buffer memory 245 and the data from the disk. SCSI command block 1600E includes instructions for a SCSI read transfer of the reconstructed data generated as a result of the execution of blocks 1600A to 1600D from buffer memory 245 to the host computer memory. With this additional information, the execution described for FIG. 7 is equivalent to that for chain 1607 and that description is incorporated herein by reference.

A bad target in a RAID 5 array is replaced with a good target. The new good target must be initialized with the data formerly residing in the bad target. The data is reconstructed for the new target again using the redundancy of the RAID 5 stripe across the original good targets. The chain and its execution sequence are exactly the same as for recovering the data from a bad target, except instead of transferring the recovered data to the host, it is transferred to the new target. Therefore, the operation performed by SCSI command block 1600E is changed from a buffer memory 245 to host computer memory transfer to a buffer memory 245 to SCSI target transfer. Everything else remains the same.

The RAID chain examples described above are actually simple applications of the chaining process of this invention, although they do utilize all of the chain building blocks. More complex chain structures can be constructed. The RAID examples can be thought of as chain segments rather than complete chains, and larger chains can be constructed by concatenating segments.

Figure 17:
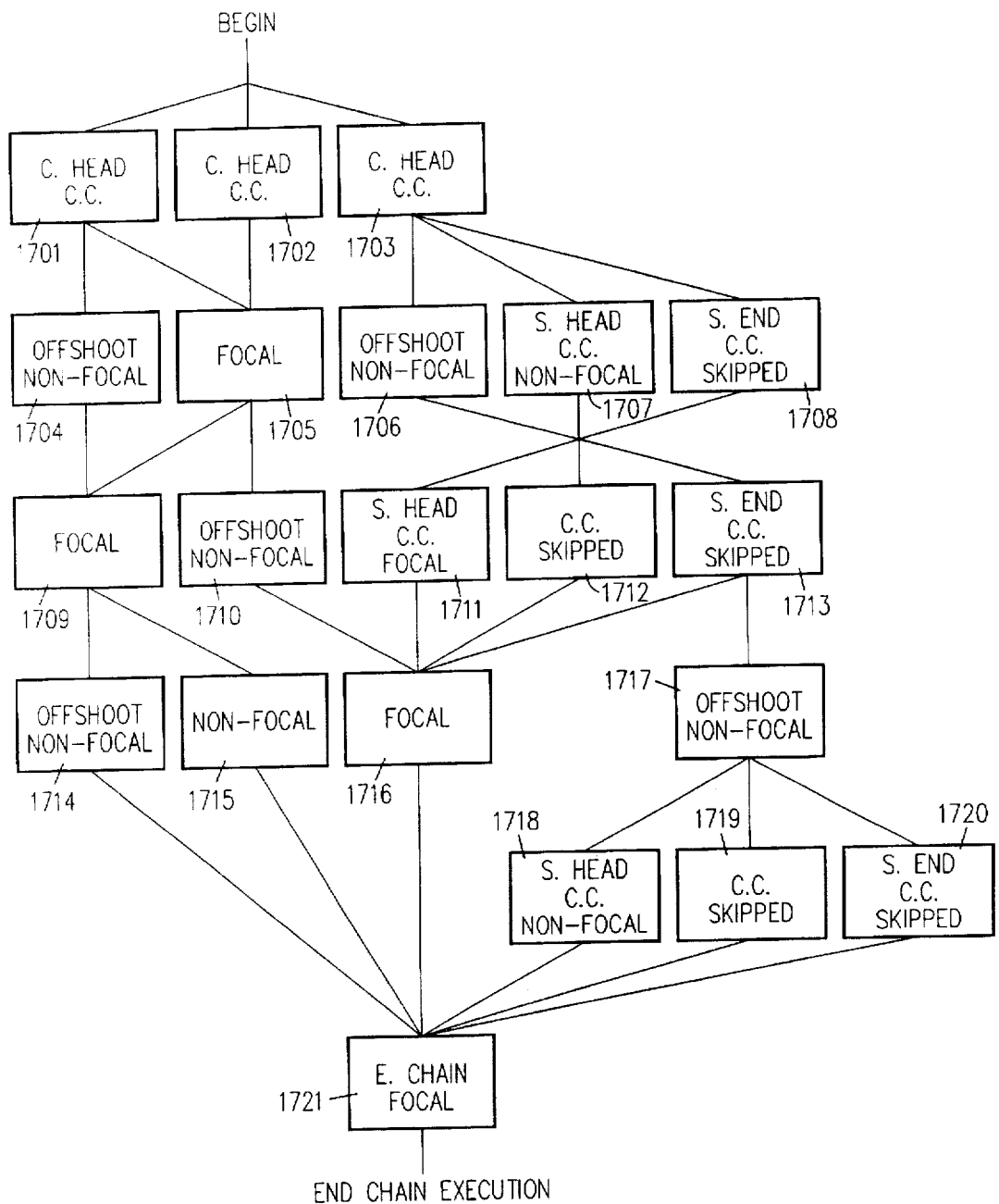
FIG. 17 is an execution flow diagram for a large, complex, chain structure according to the principles of this invention.

The chaining structure and method of this invention has the capacity for constructing large, complex, chain structures such as that illustrated in FIG. 17. Blocks 1701 to 1721 are each a SCSI command block with a structure identical to that shown in FIG. 3. FIG. 17 illustrates a chain 1700 that includes a plurality of strings of concurrent SCSI command blocks, and a plurality of chain execution paths. Each path from a head of chain block, i.e., blocks 1701 to 1703 to end of chain block 1721 is a different chain execution path.

In this example, chain 1700 has three head of chain blocks 1701 to 1703 that are enabled for concurrent execution by the host adapter driver. Table 15 gives the type of each SCSI command block in FIG. 17.

TABLE 15

TYPE OF EACH SCSI COMMAND BLOCK
IN FIG. 17

| SCSI CMD BLK | TYPE |
|---|---|
| 1701 | Head of chain, Concurrent |
| 1702 | Head of chain, Concurrent |
| 1703 | Head of chain, Concurrent |
| 1704 | Offshoot, Non-Focal |
| 1705 | Focal |

TABLE 15-continued

TYPE OF EACH SCSI COMMAND BLOCK IN FIG. 17

| SCSI CMD BLK | TYPE |
| --- | --- |
| 1706 | Offshoot, Non-Focal |
| 1707 | Head of String, Concurrent, Non-Focal |
| 1708 | End of String, Concurrent, Skipped |
| 1709 | Focal |
| 1710 | Offshoot, Non-Focal |
| 1711 | Head of String, Concurrent, Focal |
| 1712 | Concurrent, Skipped |
| 1713 | End of String, Concurrent, Skipped |
| 1714 | Offshoot, Non-Focal |
| 1715 | Non-Focal |
| 1716 | Focal |
| 1717 | Offshoot, Non-Focal |
| 1718 | Head of String, Concurrent, Non-Focal |
| 1719 | Concurrent, Skipped |
| 1720 | End of String, Concurrent, Skipped |
| 1721 | End of Chain, Focal |

The structure in FIG. 17 and the chains in general of this invention are a directed graph where the condition or conditions for traversing an edge of the graph are specified in the structure stored in memory. Specifically, according to the principles of this invention, various execution diagrams are generated using a method for specifying the execution and order of execution of a set of I/O commands with an I/O command block data structure that identifies the simultaneity, precedence, and inhibition of execution of one I/O command block by another I/O command block.

As demonstrated above, one advantage of the chaining process of this invention is that the real-time execution management task has been off-loaded from the application and driver to the host adapter. The number of interrupts to the host computer during execution of a chain of SCSI command blocks is consequently reduced by a significant fact. In addition, chain sequence management is executed much faster by the host adapter sequencers than by the host computer.

I claim:

1. A method for performing a RAID 1 read operation comprising:

building a pair of killer I/O command blocks for said RAID 1 read operation wherein each of said killer I/O comnmnand blocks includes a read command for a target device;

enabling concurrent execution of said pair of killer I/O command blocks; and marking one of said pair of killer I/O cornmand blocks for abortion by the other of said pair of killer I/O command blocks upon execution of said other of said pair of killer I/O command blocks initiating data transfer.

2. A method for performing a RAID 1 read operation as in claim 1 wherein said building a pair of killer I/O command blocks further comprises:

configuring a chain control field of one of the pair of killer I/O command blocks.

3. A method for performing a RAID 1 read operation as in claim 2 wherein said configuring a chain control field includes setting an abort flag in said chain control field.

4. A method for performing a RAID 1 read operation as in claim 1 wherein said building a pair of killer I/O command blocks further comprises:

setting a pointer in one killer I/O command block to point to the other killer I/O command block in said pair.

5. A method for performing a RAID 1 read operation as in claim 1 wherein said marking one of said pair of killer I/O command blocks for abortion by the other of said pair of killer I/O command blocks comprises setting an aborted flag in said one of said pair of killer I/O command blocks.

* * * * *